United States Patent
Fujiyama et al.

(10) Patent No.: US 9,942,112 B2
(45) Date of Patent: Apr. 10, 2018

(54) INFORMATION COLLECTION SYSTEM, SERVER APPARATUS, EDGE APPARATUS, CONTROL METHOD, AND PROGRAM

(71) Applicant: NEC Corporation, Tokyo (JP)

(72) Inventors: Kenichiro Fujiyama, Tokyo (JP); Koji Kida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/713,273

(22) Filed: May 15, 2015

(65) Prior Publication Data

US 2015/0249581 A1 Sep. 3, 2015

Related U.S. Application Data

(63) Continuation of application No. PCT/JP2014/067748, filed on Jul. 3, 2014.

(30) Foreign Application Priority Data

Nov. 25, 2013 (JP) .................................. 2013-243299

(51) Int. Cl.
*G06F 15/177* (2006.01)
*H04L 12/26* (2006.01)
(Continued)

(52) U.S. Cl.
CPC .............. *H04L 43/04* (2013.01); *H04L 67/10* (2013.01); *H04Q 9/00* (2013.01)

(58) Field of Classification Search
CPC ............ H04L 43/04; H04L 67/10; H04Q 9/00
(Continued)

(56) References Cited

U.S. PATENT DOCUMENTS 5,862,333 A * 1/1999 Graf .................... G06F 11/0715
709/223
6,405,250 B1 6/2002 Lin et al.
(Continued)

FOREIGN PATENT DOCUMENTS

JP 2000-132603 5/2000
JP 2001-282468 10/2001
(Continued)

OTHER PUBLICATIONS

International Search Report dated Sep. 30, 2014 in corresponding PCT International Application.
(Continued)

*Primary Examiner* — Michael Y Won
(74) *Attorney, Agent, or Firm* — Finnegan, Henderson, Farabow, Garrett & Dunner, L.L.P.

(57) ABSTRACT

An information collection system includes a server apparatus, a plurality of edge apparatuses, and a collection rules storage unit. The edge apparatus includes a first information generation unit that generates first information and a second information generation unit that generates second information. The collection rules storage unit stores collection rules so as to be associated with the edge apparatus and the first information that the server apparatus acquires from the edge apparatus. The server apparatus includes a first information acquisition unit that acquires the first information from the edge apparatus, a second information acquisition unit that acquires the second information from the edge apparatus, and a collection rules acquisition unit that acquires collection rules from the collection rules storage unit.

29 Claims, 16 Drawing Sheets

(51) Int. Cl.
*H04Q 9/00* (2006.01)
*H04L 29/08* (2006.01)

(58) Field of Classification Search
USPC .................. 709/224, 226, 220, 223, 230
See application file for complete search history.

(56) References Cited

U.S. PATENT DOCUMENTS

| | | | |
|---|---|---|---|
| 6,671,724 B1* | 12/2003 | Pandya et al. | 709/226 |
| 7,003,437 B2* | 2/2006 | Ichikawa et al. | 702/189 |
| 7,107,273 B2* | 9/2006 | Ohata | G06F 11/3495 |
| 7,127,716 B2* | 10/2006 | Jin | G06Q 10/10 700/1 |
| 7,185,079 B1* | 2/2007 | Bainbridge | H04L 61/2061 709/223 |
| 7,225,244 B2* | 5/2007 | Reynolds | G06F 1/14 709/203 |
| 7,403,987 B1* | 7/2008 | Marinelli et al. | 709/223 |
| 7,627,666 B1* | 12/2009 | DeGiulio | G06Q 10/08 705/28 |
| 7,689,676 B2* | 3/2010 | Vinberg et al. | 709/220 |
| 7,746,789 B2* | 6/2010 | Katoh et al. | 370/238 |
| 7,870,335 B2* | 1/2011 | Lubbers | G06F 3/0613 709/224 |
| 7,917,647 B2* | 3/2011 | Cooper et al. | 709/233 |
| 8,140,661 B2* | 3/2012 | Marilly | H04L 12/2602 709/224 |
| 8,161,475 B2* | 4/2012 | Araujo et al. | 718/1 |
| 8,161,540 B2* | 4/2012 | Mantripragada et al. | 726/13 |
| 8,321,437 B2* | 11/2012 | Lim | 707/758 |
| 8,612,572 B2* | 12/2013 | Hayes | G06N 5/025 709/203 |
| 8,738,760 B2* | 5/2014 | Adams et al. | 709/224 |
| 2001/0056485 A1* | 12/2001 | Barrett, Jr. | G06F 3/0481 709/224 |
| 2004/0049579 A1* | 3/2004 | Ims | H04L 67/2823 709/225 |
| 2005/0251572 A1 | 11/2005 | McMahan et al. | |
| 2008/0010368 A1* | 1/2008 | Hubbard et al. | 709/223 |
| 2009/0067440 A1* | 3/2009 | Chadda et al. | 370/401 |
| 2010/0023604 A1* | 1/2010 | Verma | H04L 41/0631 709/221 |
| 2010/0188990 A1* | 7/2010 | Raleigh | 370/252 |
| 2011/0238496 A1* | 9/2011 | Gurbuxani et al. | 705/14.49 |
| 2013/0097321 A1* | 4/2013 | Tumbde | H04L 67/1008 709/226 |
| 2015/0012656 A1* | 1/2015 | Phillips | H04L 47/26 709/226 |
| 2015/0052254 A1* | 2/2015 | Zhao | H04L 67/101 709/226 |

FOREIGN PATENT DOCUMENTS

| | | |
|---|---|---|
| JP | 2002-16599 | 1/2002 |
| JP | 2003-296866 | 10/2003 |
| JP | 2010-182030 | 8/2010 |

OTHER PUBLICATIONS

Extended European Search Report in counterpart European Patent application No. 14864311.7, dated Jul. 12, 2017.

* cited by examiner

| RECORD ID | SIGNAL SET | CONTENT | FREQUENCY | APPLICATION TARGET | PRIORITY | NUMBER OF APPLICATIONS |
|---|---|---|---|---|---|---|
| 1 | (E1:x = s0) | data1 | 1sec | E1 | 100 | 10 TIMES |
| 2 | (E1:x = s1) & (E2:y = s1) | data2 | 500msec | E2 | 50 | 5 TIMES |
| 3 | (E1:x = s2) & (E3:y = s2), within 10sec | data3 | 2sec | E4 | 30 | 15 TIMES |
| 4 | (E4:x = s3), 3 times | data4 | 10sec | E5 | 60 | UNLIMITED |
| 5 | (E5:x = s3) | data5 | 2sec | E1 | 40 | 10 TIMES |
| 6 | (E5:x = s3) | data6 | 3sec | E6 | 30 | 5 TIMES |
| ... | ... | ... | ... | ... | ... | ... |

| RECORD ID | SIGNAL SET | CONTENT | FREQUENCY | APPLICATION TARGET | PRIORITY | NUMBER OF APPLICATIONS | COLLECTION LOAD |
|---|---|---|---|---|---|---|---|
| 1 | (E1:x = s0) | data1 | 1sec | E1 | 100 | 10 TIMES | 10 |
| 2 | (E1:x = s1) & (E2:y = s1) | data2 | 500msec | E2 | 50 | 5 TIMES | 50 |
| 3 | (E1:x = s2) & (E3:y = s2), within 10sec | data3 | 2sec | E4 | 30 | 15 TIMES | 30 |
| 4 | (E4:x = s3), 3 times | data4 | 10sec | E5 | 60 | UNLIMITED | 20 |
| 5 | (E5:x = s3) | data5 | 2sec | E1 | 40 | 10 TIMES | 10 |
| 6 | (E5:x = s3) | data6 | 3sec | E6 | 30 | 5 TIMES | 40 |
| ... | ... | ... | ... | ... | ... | ... | ... |

| RECORD ID | SIGNAL SET | GENERATION RULES |
|---|---|---|
| 1 | (E1:x = s0) | x, y, z |
| 2 | (E2:y = s1) | 20 < x < 40 ? ok : error |
| ... | ... | ... |

302 306 308

300

US 9,942,112 B2

INFORMATION COLLECTION SYSTEM, SERVER APPARATUS, EDGE APPARATUS, CONTROL METHOD, AND PROGRAM

BACKGROUND

Technical Field

The present invention relates to an information collection system, a server apparatus, an edge apparatus, a control method, and a program.

Related Art

There is an information collection system that collects information from a sensor, a portable terminal, or the like through a network. As an example of such an information collection system, there is a system that monitors anomalies of equipment or the like using an edge apparatus Patent Documents 1-3 disclose techniques regarding the information collection system. The network measurement control system disclosed in Patent Document 1 monitors network traffic using an apparatus called a meter. In this system, an apparatus called a control server collects data regarding network traffic from the meter. The meter controls, for each control server, a transmission interval at which data is transmitted to the control server and the data type.

Patent Document 2 discloses a remote monitoring system for monitoring devices. In this system, each device internally performs an anomaly determination, and transmits an anomaly identification code to an air conditioning controller when there is an anomaly. Each air conditioning controller receives the anomaly identification code from the equipment, and then transmits data corresponding to the received code to a remote monitoring server. In this manner, data regarding the anomalies of each device is collected in the remote monitoring server.

Patent Document 3 discloses a technique of that a client computer acquires status data from a printer connected through a network. The client computer measures the amount of traffic in the network when acquiring the status data from the printer. When the amount of traffic is larger than a predetermined amount, the client computer waits until the amount of traffic becomes less than the predetermined amount. After the amount of traffic becomes less than the predetermined amount, the client computer acquires the status data.

RELATED DOCUMENT

Patent Document

[Patent Document 1] Japanese Unexamined Patent Publication No. 2002-016599

[Patent Document 2] Japanese Unexamined Patent Publication No. 2003-296866

[Patent Document 3] Japanese Unexamined Patent Publication No. 2001-282468

The present inventors have examined a method for reducing the load on a system in an information collection system that collects information from an edge apparatus. In the case of the network measurement control system disclosed in Patent Document 1, each meter does not consider data transmission performed by other meters. Therefore, in this system, control considering the overall load on the network or the control server is not performed.

Similarly, also in the remote monitoring system disclosed in Patent Document 2, each air conditioning controller does not consider data transmission performed by other air conditioning controllers. Therefore, also in this system, control considering the overall load on the network or the remote monitoring server is not performed.

Patent Document 3 does not disclose a method of controlling the status data acquisition of the client computer in consideration of a factor other than the amount of network traffic.

DISCLOSURE OF THE INVENTION

The invention has been made in view of such a situation. It is an object of the invention to provide a technique for reducing the load on an information collection system that collects information from an edge apparatus.

There is provided an information collection system including a server apparatus and a plurality of edge apparatuses. Each of the edge apparatuses includes a first information generation unit that generates first information and a second information generation unit that generates second information. In addition, the information collection system includes a collection rules storage unit that stores collection rules so as to be associated with each of the edge apparatuses and the first information that the server apparatus acquires from the edge apparatus, the collection rules being information indicating any one or more of: content of information included in the second information; a frequency of acquiring the second information; and the edge apparatus to which the collection rules are applied. The server apparatus includes: a first information acquisition unit that acquires the first information from the edge apparatus; a second information acquisition unit that acquires the second information from the edge apparatus; and a collection rules acquisition unit that acquires from the collection rules storage unit the collection rules corresponding to the first information acquired by the first information acquisition unit and the edge apparatus that has generated the first information. In another exemplary embodiment, there are provided a server apparatus and an edge apparatus that are the server apparatus and the edge apparatus included in the information collection system.

There is provided a control method executed by an information collection system. The information collection system includes a server apparatus, a plurality of edge apparatuses, and a collection rules storage unit. The control method comprises: generating first information by each of the edge apparatuses; generating second information by each of the edge apparatuses; acquiring the first information from the edge apparatus by the server apparatus; acquiring collection rules from the collection rules storage unit by the server apparatus, the collection rules corresponding to the first information acquired by the first information acquisition unit and the edge apparatus that has generated the first information; and acquiring the second information from the edge apparatus by the server apparatus. The collection rules stored in the collection rules storage unit are information that is associated with the edge apparatus and the first information that the server apparatus acquires from the edge apparatus and that indicates any one or more of: content of information included in the second information; a frequency of acquiring the second information; and the edge apparatus to which the collection rules are applied.

There is provided a storage medium that stores a program for controlling an information collection system. The information collection system includes a server apparatus, a plurality of edge apparatuses, and a collection rules storage unit. The program causes each of the edge apparatuses to have a first information generation function of generating first information, which is information regarding a state of the edge apparatus, and a second information generation function of generating second information, which is information including at least information other than the first information. The program causes the server apparatus to have a first information acquisition function of acquiring the first information from the edge apparatus and a collection rules acquisition function of acquiring collection rules from the collection rules storage unit, the collection rules corresponding to the first information acquired by the first information acquisition function and the edge apparatus that has generated the first information. The collection rules stored in the collection rules storage unit are information that is associated with the edge apparatus and the first information that the server apparatus acquires from the edge apparatus and that indicates any one or more of content of information included in the second information, a frequency of acquiring the second information, and the edge apparatus to which the collection rules are applied.

According to the exemplary embodiments of the invention, there is provided a technique for more reliably performing natural communication between an information collection system and a person.

BRIEF DESCRIPTION OF THE DRAWINGS

The above objects and other objects, features and advantages will become apparent by preferred exemplary embodiments to be described below and the accompanying drawings.

FIG. 9 is a diagram illustrating information stored in a collection rules storage unit in a table format;

FIG. 11 is a diagram illustrating a collection rules table in a second exemplary embodiment.

FIG. 15 is a diagram illustrating information stored in a generation rules storage unit in a table format.

DESCRIPTION OF EXEMPLARY EMBODIMENTS

Figure 1:
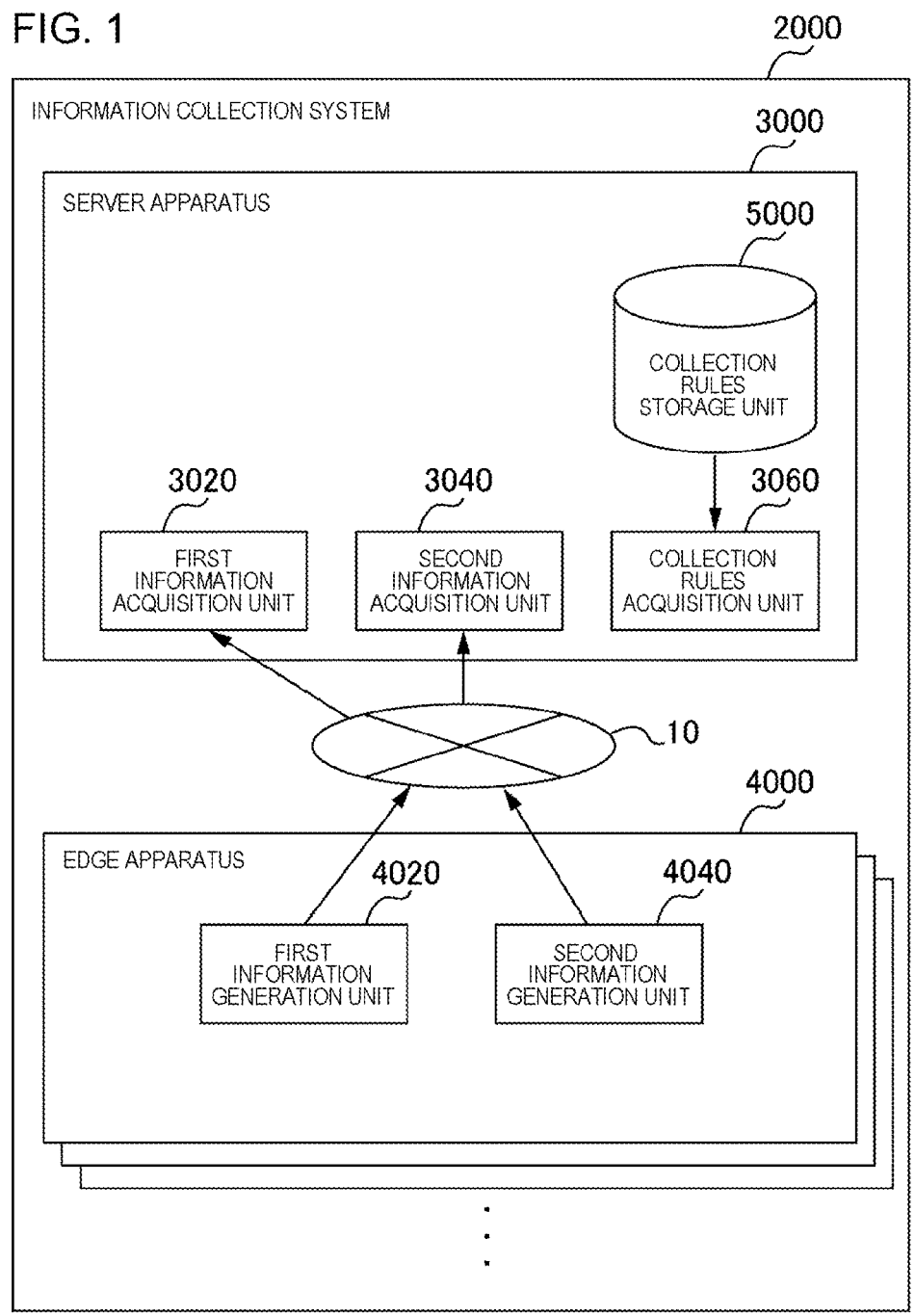
FIG. 1 is a block diagram illustrating an information collection system according to a first exemplary embodiment.

Hereinafter, exemplary embodiments of the invention will be described with reference to the diagrams. In addition, the same components are denoted by the same reference numerals in all diagrams, and explanation thereof will not be repeated.

First Exemplary Embodiment

FIG. 1 is a block diagram illustrating an information collection system 2000 according to a first exemplary embodiment. In FIG. 1, arrows indicate the flow of information. In FIG. 1, each block does not indicate the configuration of hardware units, but indicates the configuration of functional units.

<Overview>

The information collection system 2000 includes a server apparatus 3000, a plurality of edge apparatuses 4000, and a collection rules storage unit 5000. The server apparatus 3000 is an apparatus that collects information from the edge apparatus 4000. Hereinafter, each apparatus and the storage unit will be concretely described.

<Edge Apparatus 4000>

The edge apparatus 4000 includes a first information generation unit 4020 and a second information generation unit 4040. The first information generation unit 4020 generates first information. The first information generated by the first information generation unit 4020 is information regarding the state of the edge apparatus 4000 including this first information generation unit 4020 or the state of a device monitored by the edge apparatus 4000 (hereinafter, referred to as a device to be monitored). The second information generation unit 4040 generates second information. The second information generated by the second information generation unit 4040 may be information including the same content as the first information, or may be information including at least information other than the first information.

<Collection Rules Storage Unit 5000>

The collection rules storage unit 5000 stores collection rules so as to be associated with the edge apparatus 4000 and the first information that the server apparatus 3000 acquires from the edge apparatus 4000. The collection rule indicates any one or more of: the content of information included in the second information; the frequency of acquisition of the second information; and the edge apparatus 4000 to which this collection rule is applied.

<Server Apparatus 3000>

The server apparatus 3000 includes a first information acquisition unit 3020, a second information acquisition unit 3040, and a collection rules acquisition unit 3060. The first information acquisition unit 3020 acquires the first information from the edge apparatus 4000. The second information acquisition unit 3040 acquires the second information from the edge apparatus 4000. The collection rules acquisition unit 3060 acquires from the collection rules storage unit 5000 the collection rules which correspond to the first information acquired by the first information acquisition unit 3020 and the edge apparatus 4000 that has generated the first information.

<Connections Between Components>

The server apparatus 3000 and the edge apparatus 4000 are connected to each other through a communication network 10. The communication network 10 may be a wired network, or may be wireless network, or may be a mixture of the wired and wireless network.

The server apparatus 3000 is communicably connected to the collection rules storage unit 5000. The collection rules storage unit 5000 may be provided inside the server apparatus 3000, or may be provided outside the server apparatus 3000. In the case shown in FIG. 1, the collection rules storage unit 5000 is provided inside the server apparatus 3000. When the collection rules storage unit 5000 is provided outside the server apparatus 3000, the server apparatus 3000 and the collection rules storage unit 5000 may be connected to each other through the communication network 10 or may be connected to each other through another communication network.

<Operations and Effects>

According to the information collection system 2000 of the present exemplary embodiment, collection rules regarding the collection of the second information are acquired based on the edge apparatus 4000 and the first information acquired from this edge apparatus 4000. Here, the collection rule indicates any one or more of: the content of information included in the second information; the frequency of acquisition of the second information; and the edge apparatus 4000 to which this collection rule is applied. Accordingly, for each combination of the edge apparatus 4000 and the first information, it is performed to predict the load on the information collection system 2000 by collecting the second information, and to store appropriate collection rules in the collection rules storage unit 5000 so that the load on the information collection system 2000 is reduced. Thus, it is achieved to collect the second information in comprehensive consideration of the load on the entire information collection system 2000. As a result, it is achieved to reduce a probability of the occurrence of adverse effects, such as "a part of the server apparatus 3000 or the edge apparatus 4000 cannot operate due to high load".

In addition, according to the information collection system 2000 of the present exemplary embodiment, it is the server apparatus 3000 to perform a process of acquiring the collection rules based on the first information. Therefore, the implementation of each edge apparatus 4000 can be simplified, and it is achieved to reduce the size of the edge apparatus 4000 or reduce the cost of the edge apparatus 4000.

<Hardware Configuration>

Each functional component included in the server apparatus 3000 and the edge apparatus 4000 is implemented as at least one hardware component in an individual or combined state, for example. In addition, for example, each functional component is implemented as at least one software component. In addition, for example, each functional component is implemented by a combination of hardware components and software components.

<<Hardware Configuration of the Server Apparatus 3000>>

The server apparatus 3000 is a variety of computers. For example, the server apparatus 3000 is a personal computer (PC), a server computer, a portable terminal, or a tablet PC.

Figure 2:
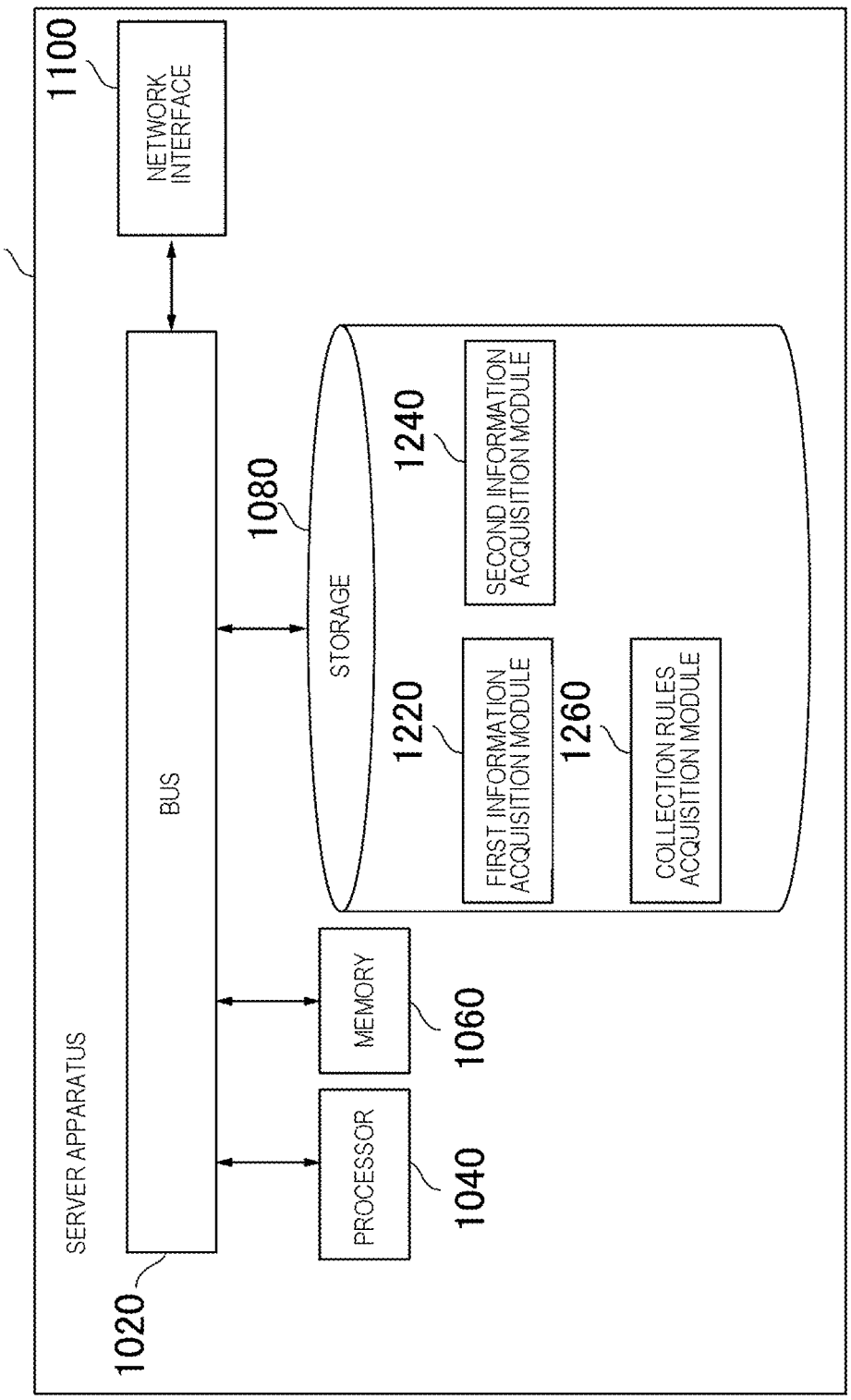
FIG. 2 is a block diagram illustrating the hardware configuration of a server apparatus according to the first exemplary embodiment.

FIG. 2 is a block diagram illustrating the hardware configuration of the server apparatus 3000 according to the first exemplary embodiment. In FIG. 2, the server apparatus 3000 includes a bus 1020, a processor 1040, a memory 1060, a storage 1080, and a network interface 1100.

The bus 1020 is a data transmission line used when the processor 1040, the memory 1060, the storage 1080, and the network interface 1100 transmit and receive data to and from each other. The processor 1040 is an arithmetic processing unit, such as a Central Processing Unit (CPU) or a Graphics Processing Unit (GPU), for example. The memory 1060 is a memory, such as a random access memory (RAM) or a read only memory (ROM), for example. The storage 1080 is a storage device such as a hard disk, a solid state drive (SSD), or a memory card, for example. In addition, the storage 1080 may be a memory, such as a RAM or a ROM. The network interface 1100 is an interface for connecting to the communication network 10. For example, the network interface 1100 is a network interface card (NIC).

A first information acquisition module 1220 is a program causing the server apparatus 3000 to have a function of the first information acquisition unit 3020. The processor 1040 realizes the function of the first information acquisition unit 3020 by executing the first information acquisition module 1220.

A second information acquisition module 1240 is a program causing the server apparatus 3000 to have a function of the second information acquisition unit 3040. The processor 1040 realizes the function of the second information acquisition unit 3040 by executing the second information acquisition module 1240.

A collection rules acquisition module 1260 is a program causing the server apparatus 3000 to have a function of the collection rules acquisition unit 3060. The processor 1040 realizes the function of the collection rules acquisition unit 3060 by executing the collection rules acquisition module 1260.

For example, the processor 1040 reads each of the above modules onto the memory 1060 and executes it. However, the processor 1040 may execute each of the above modules without reading it onto the memory 1060.

The storage 1080 stores each of the above modules. When the collection rules storage unit 5000 is included in the server apparatus 3000, the storage 1080 may function as the collection rules storage unit 5000 by storing the collection rules. The collection rules may be stored in the memory 1060.

The hardware configuration of the server apparatus 3000 is not limited to the configuration shown in FIG. 2. For example, each of the above modules may be stored in the memory 1060. In this case, the server apparatus 3000 may not include the storage 1080.

<<Hardware Configuration of the Edge Apparatus 4000>>

The edge apparatus 4000 is a variety of computers. For example, the edge apparatus 4000 is a portable terminal or a tablet PC. In addition, the edge apparatus 4000 may be a PC or a server computer.

Figure 3:
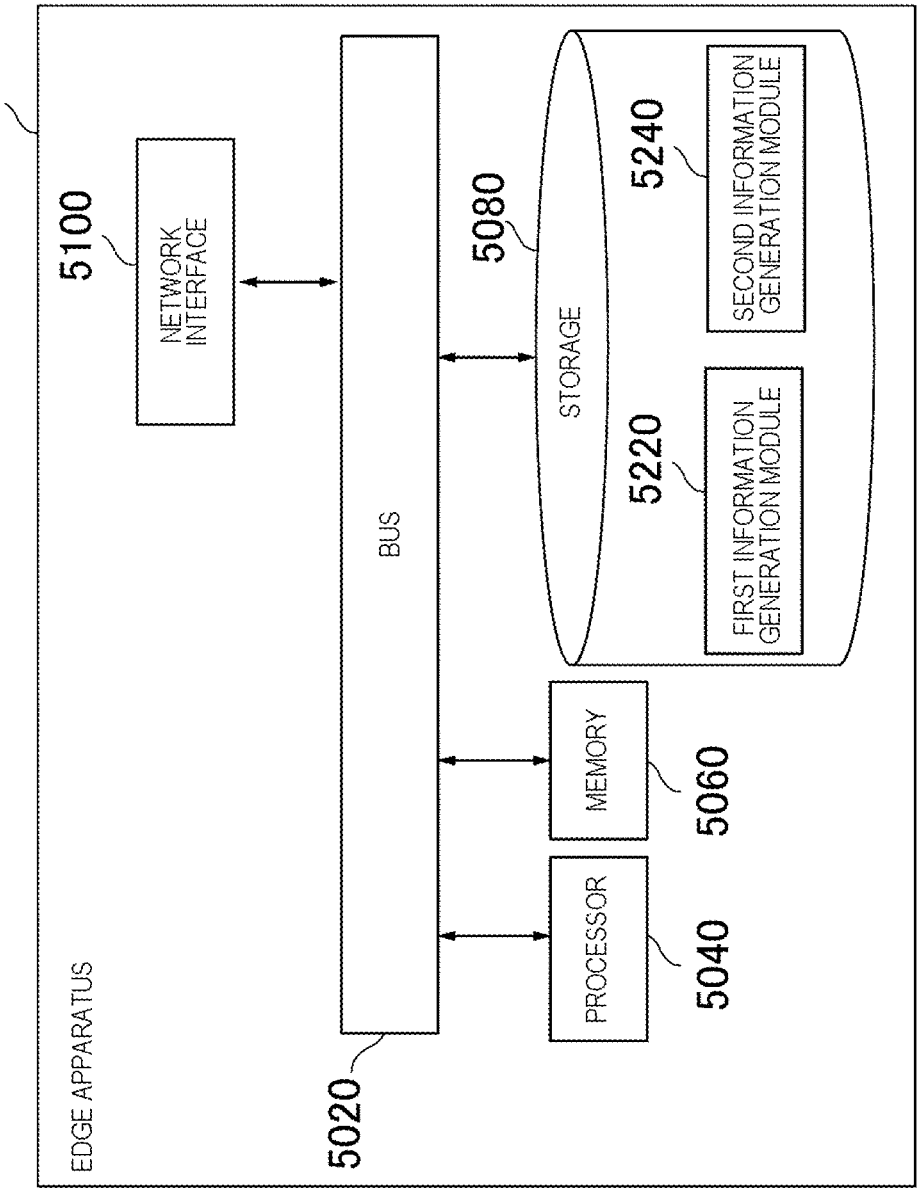
FIG. 3 is a block diagram illustrating the hardware configuration of an edge apparatus according to the first exemplary embodiment.

FIG. 3 is a block diagram illustrating the hardware configuration of the edge apparatus 4000 according to the first exemplary embodiment. In FIG. 3, the edge apparatus 4000 includes a bus 5020, a processor 5040, a memory 5060, a storage 5080, and a network interface 5100. These are respectively the same as the bus 1020, the processor 1040, the memory 1060, the storage 1080, and the network interface 1100 shown in FIG. 2.

A first information generation module 5220 is a program causing the edge apparatus 4000 to have a function of the first information generation unit 4020. The processor 5040 realizes the function of the first information generation unit 4020 by executing the first information generation module 5220.

A second information generation module 5240 is a program causing the edge apparatus 4000 to have a function of the second information generation unit 4040. The processor 5040 realizes the function of the second information generation unit 4040 by executing the second information generation module 5240.

<<Hardware Configuration of the Collection Rules Storage Unit 5000>>

When the collection rules storage unit 5000 is provided outside the server apparatus 3000, the collection rules storage unit 5000 is implemented as a network storage or a database server. The case where the collection rules storage unit 5000 is provided inside the server apparatus 3000 has been described above.

<Flow of Process>

Figure 4:
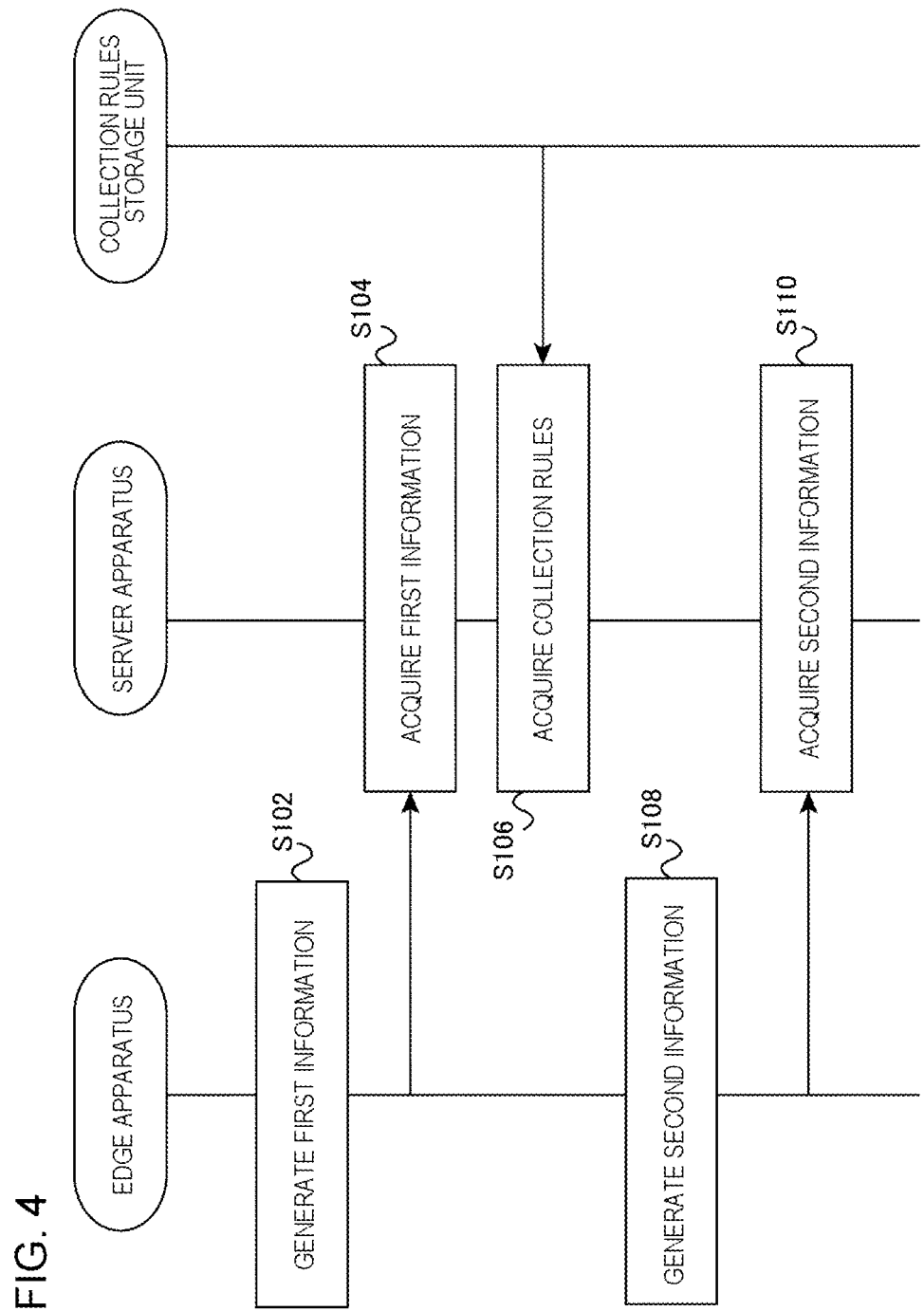
FIG. 4 is a flowchart illustrating the flow of the process performed in the information collection system of the first exemplary embodiment.

FIG. 4 is a flowchart illustrating the flow of the process performed in the information collection system 2000 of the first exemplary embodiment. In step S102, the first information generation unit 4020 generates the first information. In step S104, the first information acquisition unit 3020 acquires the first information. In step S106, the collection rules acquisition unit 3060 acquires collection rules corresponding to the first information acquired by the first information acquisition unit 3020 and the edge apparatus 4000 that has generated this first information. In step S108, the second information generation unit 4040 generates the second information. In step S110, the second information acquisition unit 3040 acquires the second information.

Note that, the flow of the process performed in the information collection system 2000 of the first exemplary embodiment is not limited to the flow shown in FIG. 4. For example, the timing at which the edge apparatus 4000 generates the second information is not limited to the timing shown in FIG. 4 as long as the timing is before the second information is acquired by the server apparatus 3000.

Hereinafter, the information collection system 2000 of the present exemplary embodiment will be described in more detail.

<Details of the First Information Generation Unit 4020>

The first information generation unit 4020 generates various kinds of first information. For example, the first information generation unit 4020 determines whether or not an anomaly has occurred in the edge apparatus 4000 including this first information generation unit 4020 or the device to be monitored by the edge apparatus 4000. Then, the first information generation unit 4020 generates the first information indicating the result of the anomaly determination.

The result of the anomaly determination regarding the edge apparatus 4000 or the device to be monitored by the edge apparatus 4000 indicates a result of anomaly determination regarding any one or more of components included therein (hardware or software), for example. In addition, for example, the result of the anomaly determination regarding the edge apparatus 4000 or the device to be monitored by the edge apparatus 4000 indicates one anomaly determination result regarding the entire of this edge apparatus 4000 or one anomaly determination result regarding the entire of this device to be monitored.

In addition, the first information generation unit 4020 acquires one or more parameters indicating the state of the edge apparatus 4000 including the first information generation unit 4020 or the state of the device to be monitored by this edge apparatus 4000, and generates the first information indicating the acquired parameters. In this case, for example, the first information includes the utilization of the computer resources in the edge apparatus 4000 or the device to be monitored.

For example, the first information generation unit 4020 generates information indicating the location of the edge apparatus 4000 including the first information generation unit 4020 or the device to be monitored by the edge apparatus 4000 as the first information (hereinafter, referred to as location information). Since the technique for generating the location information is a known technique, the method of generating the location information will not be explained.

<Details of the Second Information Generation Unit 4040>

The second information generation unit 4040 generates various kinds of second information. For example, the second information indicates detailed information regarding anomalies occurring in the edge apparatus 4000 or the device to be monitored by the edge apparatus 4000. For example, the detailed information is the content of anomalies, the current detailed status of the edge apparatus 4000 or the device to be monitored, or a log regarding the status of the edge apparatus 4000 or the device to be monitored.

Suppose that the device to be monitored is a gas cylinder. In this case, the second information may indicate the remaining gas amount of the gas cylinder, for example. Therefore, for example, when the first information indicating that an anomaly has occurred in the gas cylinder is acquired, it is possible to check whether or not gas leakage has occurred or how much gas has leaked based on the second information.

In addition, suppose that the device to be monitored is a vending machine. In this case, the second information may indicate the remaining number of goods of each kind, the number of coins of each type, or the number of bills of each type in the vending machine, for example. Therefore, for example, when the first information indicating that the housing of the vending machine has been opened illegally is acquired, it is possible to check whether or not goods or money has been lost or to check the number of lost goods or the amount of lost money based on the second information.

In addition, suppose that the first information is location information indicating the location of the edge apparatus 4000. In this case, the second information is also location information indicating the location of the edge apparatus 4000. In this case, collection rules are configured to include the collection frequency of the second information, and this frequency is configured to be higher than the frequency of the first information. The collection rules are applied when the location of the edge apparatus 4000 indicated by the first information is within a predetermined distance from the server apparatus 3000. Therefore, it is possible to realize a process in which "the server apparatus 3000 checks the location of the edge apparatus 4000 less frequently when the edge apparatus 4000 is away from the server apparatus 3000, and the server apparatus 3000 checks the location of the edge apparatus 4000 frequently when the edge apparatus 4000 is close to the server apparatus 3000". Thus, it is possible to implement a monitoring system that monitors the location of the edge apparatus 4000 at the appropriate frequency while suppressing the load on the information collection system 2000.

In addition, suppose that the first information is the location information of the edge apparatus 4000, and the edge apparatus 4000 is an apparatus mounted in a vehicle.

In this case, for example, the server apparatus 3000 acquires, as the second information, information for providing a service to the vehicle based on the location of the vehicle. For example, suppose that the server apparatus 3000 provides a service for recommending the vehicle to refuel at a gas station. In this case, the second information is the remaining amount of gas in the vehicle. Collection rules for acquiring the second information are applied when the location of the vehicle indicated by the first information is near the gas station. When the location of the vehicle indicated by the first information is near the gas station, the server apparatus 3000 acquires the second information indicating the remaining amount of gas in the vehicle. When the remaining amount of gas is equal to or less than a predetermined amount, the server apparatus 3000 transmits the location information of the gas station to the edge apparatus 4000. In this case, for example, it is preferable that the edge apparatus 4000 be a car navigation system. The edge apparatus 4000 can recommend the driver to go to the gas station by displaying the location information of the gas station received from the server apparatus 3000 on the screen.

<Method of Collecting the First Information>

Figure 5:
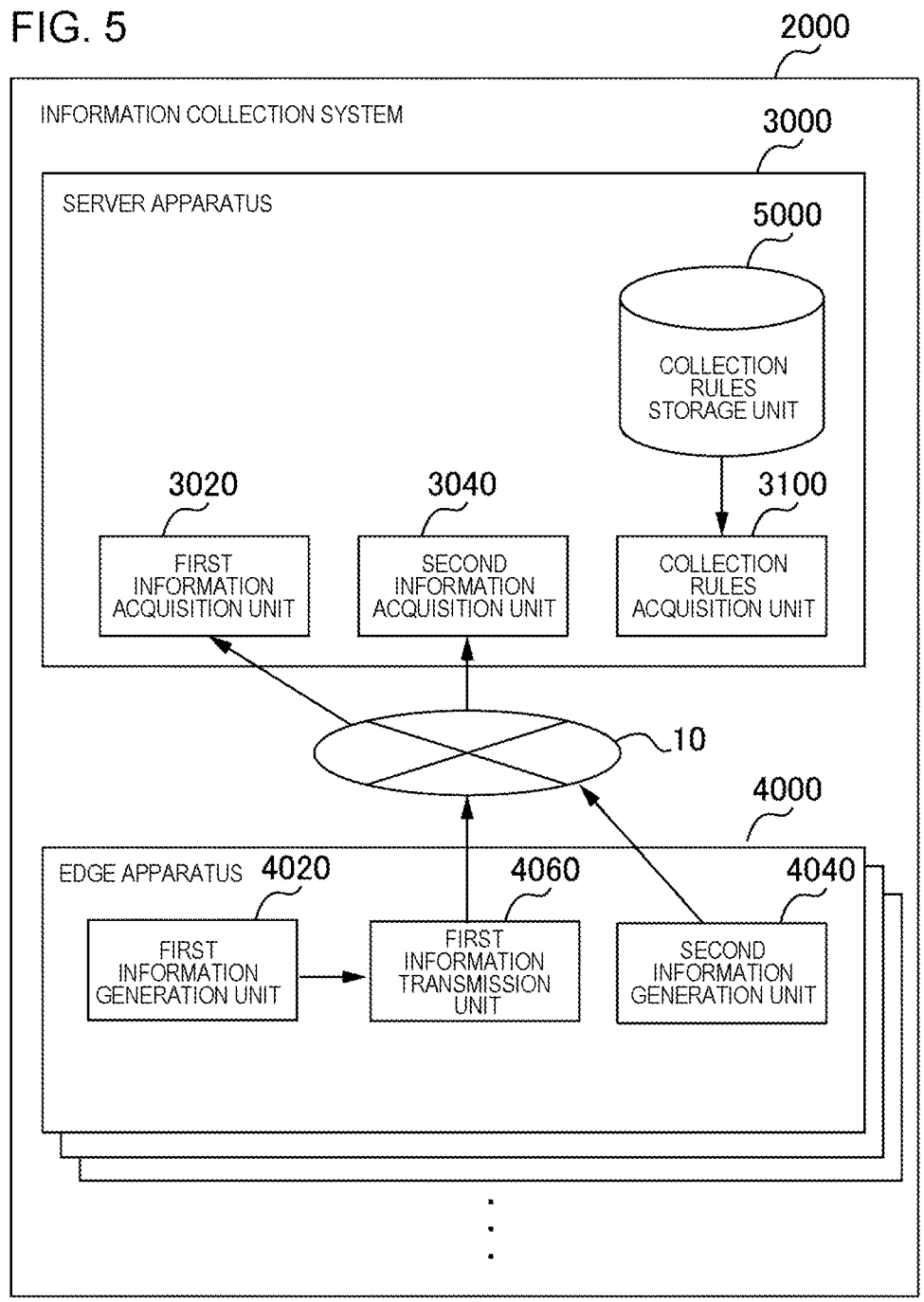
FIG. 5 is a block diagram showing an information collection system in a case where an edge apparatus includes a first information transmission unit.

There are various methods with which the first information acquisition unit 3020 acquires the first information. For example, the first information acquisition unit 3020 acquires the first information by receiving the first information transmitted from the edge apparatus 4000. In this case, the edge apparatus 4000 includes a first information transmission unit 4060 that transmits the first information of this edge apparatus 4000 to the server apparatus 3000. FIG. 5 is a block diagram illustrating the information collection system 2000 when the edge apparatus 4000 includes the first information transmission unit 4060.

The first information transmission unit 4060 transmits the first information in various cases. For example, the first information transmission unit 4060 transmits the first information in response to the instruction from the first information acquisition unit 3020. In this case, the server apparatus 3000 includes a functional component that requests the first information transmission unit 4060 to transmit the first information.

For example, the first information transmission unit 4060 transmits the first information regularly or irregularly. When the first information transmission unit 4060 transmits the first information irregularly, the first information transmission unit 4060 transmits the first information in response to a change in the state of the edge apparatus 4000 including this first information transmission unit 4060.

Figure 6:
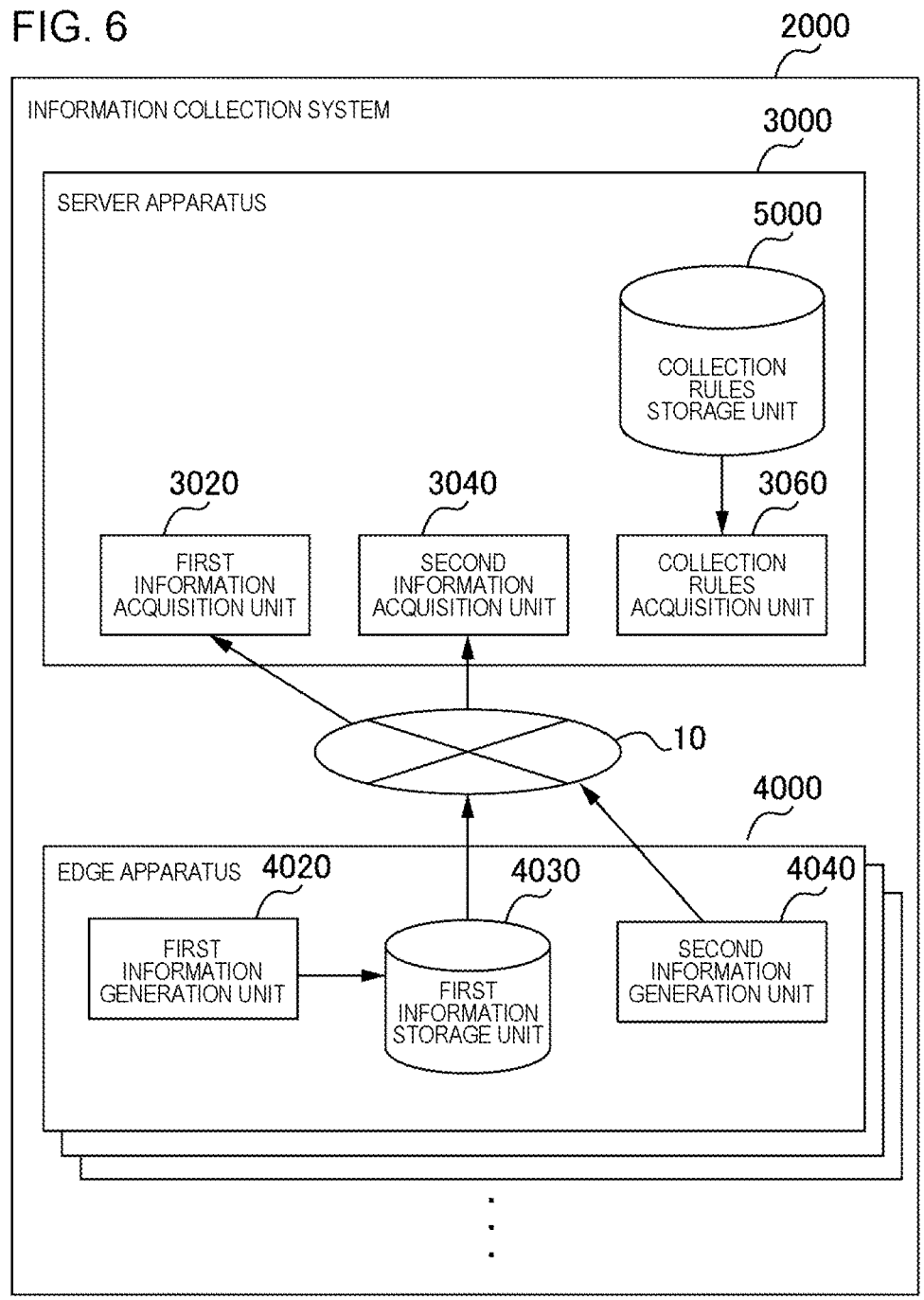
FIG. 6 is a block diagram showing an information collection system in a case where an edge apparatus includes a first information storage unit.

The server apparatus 3000 may acquire the first information by reading the first information from a first information storage unit 4030 in which the first information is stored. In this case, the edge apparatus 4000 includes the first information storage unit 4030 that stores the first information generated by the first information generation unit 4020. FIG. 6 is a block diagram showing the information collection system 2000 when the edge apparatus 4000 includes the first information storage unit 4030.

<Method of Collecting the Second Information>

Figure 7:
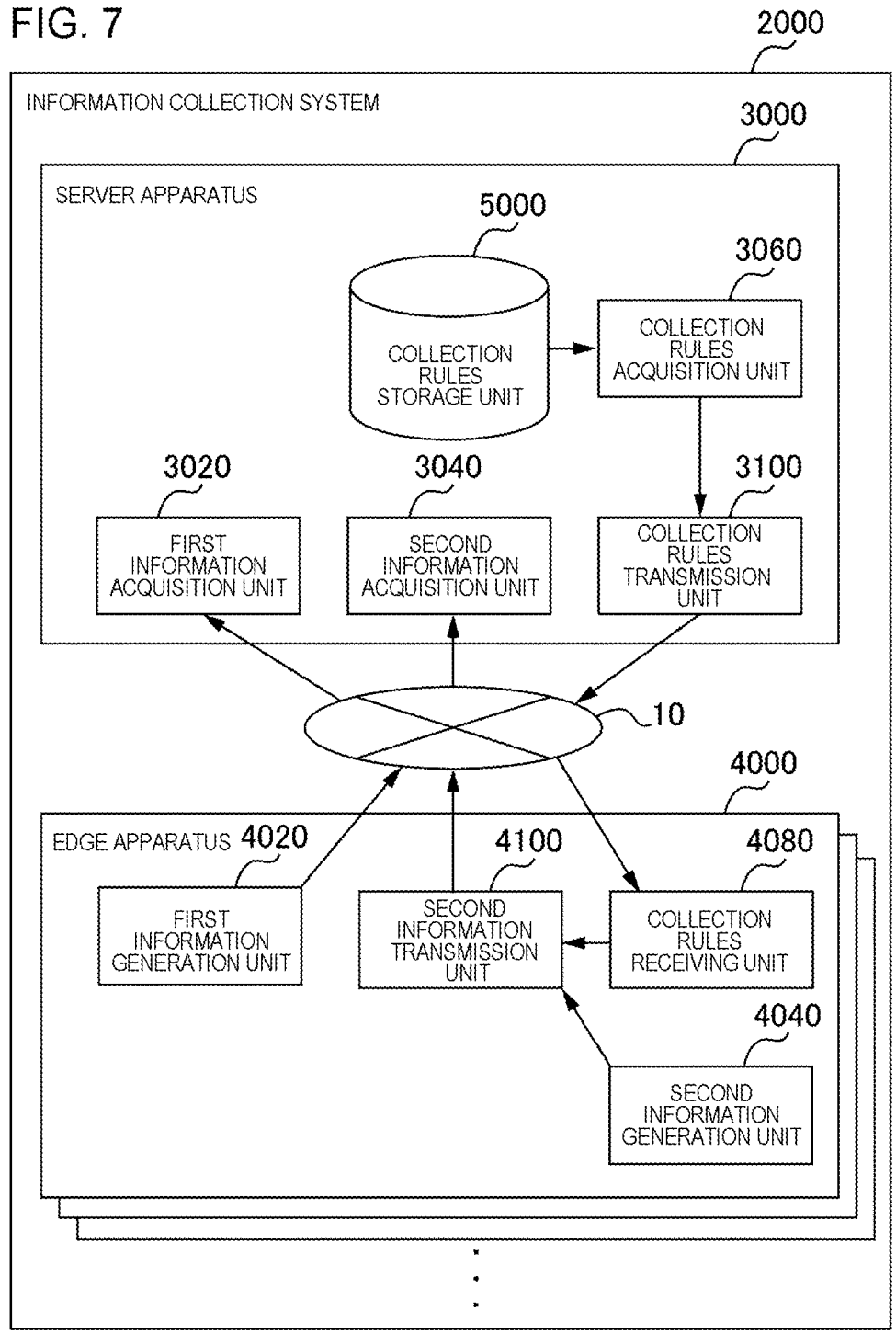
FIG. 7 is a block diagram illustrating an information collection system in a case where second information is transmitted from an edge apparatus.

There are various methods with which the second information acquisition unit 3040 acquires the second information. For example, the second information acquisition unit 3040 acquires the second information by receiving the second information transmitted from the edge apparatus 4000. FIG. 7 is a block diagram illustrating the information collection system 2000 when the second information is transmitted from the edge apparatus 4000.

In this case, the edge apparatus 4000 acquires collection rules from the server apparatus 3000, and transmits the second information based on the acquired collection rules. In order to do so, the server apparatus 3000 includes a collection rules transmission unit 3100. The collection rules transmission unit 3100 transmits to the edge apparatus 4000 collection rules applied to this edge apparatus 4000.

In addition, the edge apparatus 4000 includes a collection rules receiving unit 4080 and a second information transmission unit 4100. The collection rules receiving unit 4080 receives from the server apparatus 3000 the collection rules to be applied to the edge apparatus 4000 including this collection rules receiving unit 4080. The second information transmission unit 4100 transmits the second information to the server apparatus 3000 based on the collection rules.

The second information generation unit 4040 may acquire the collection rules received by the collection rules receiving unit 4080 and generate the second information based on the collection rules. In this case, the second information transmission unit 4100 transmits the second information generated by the second information generation unit 4040 to the server apparatus 3000.

However, the second information generation unit 4040 may generate the second information regardless of collection rules. In this case, the second information transmission unit 4100 selects the second information to be transmitted to the server apparatus 3000, from the second information generated by the second information generation unit 4040 based on the collection rules. Then, the second information transmission unit 4100 transmits only the selected second information to the server apparatus 3000.

Figure 8:
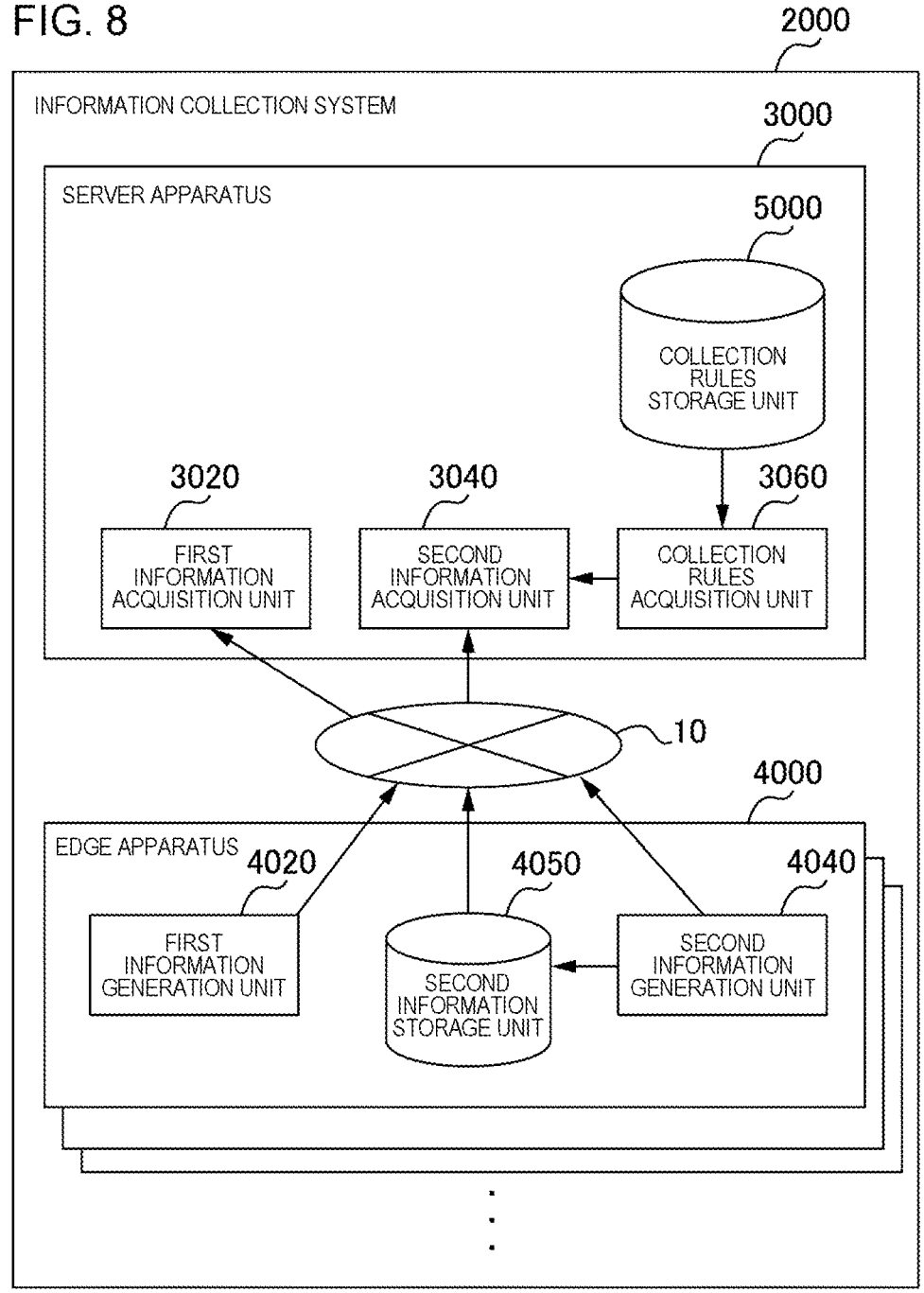
FIG. 8 is a block diagram showing an information collection system in a case where an edge apparatus includes a second information storage unit.

The server apparatus 3000 may acquire the second information by reading the second information stored in the edge apparatus 4000 based on the collection rules. In this case, the edge apparatus 4000 includes a second information storage unit 4050 that stores the second information generated by the second information generation unit 4040. In this case, the server apparatus 3000 does not need to transmit the collection rules to the edge apparatus 4000. FIG. 8 is a block diagram showing the information collection system 2000 when the edge apparatus 4000 includes the second information storage unit 4050.

<Details of Collection Rules>

As described above, the collection rules indicate any one or more of: the content of information included in the second information; the frequency of acquisition of the second information; and the edge apparatus 4000 to which the collection rules are applied. Suppose that the first information indicates that an anomaly has occurred in a specific hardware provided in the edge apparatus 4000. In this case, for example, the content included in the second information is a detailed status regarding this specific hardware.

Preferably, more critical the anomaly occurring in the edge apparatus 4000 is, shorter time interval the frequency of acquiring the second information indicates, for example.

For example, the edge apparatus 4000 to which the collection rules are applied may be the edge apparatus 4000 that has generated the first information, or may be the edge apparatus 4000 that has not generated the first information. Here, suppose that each edge apparatus 4000 monitors the state of another edge apparatus 4000. In this case, when an anomaly has occurred in a certain edge apparatus 4000, detailed information regarding the anomaly of the edge apparatus 4000 can be acquired from another edge apparatus 4000 that monitors the edge apparatus 4000. Therefore, even if the edge apparatus 4000 in which the anomaly has been generated cannot generate the second information, it is possible to collect the information regarding the anomaly of the edge apparatus 4000. This can be realized by making the edge apparatus 4000 to which the collection rules are applied different from the edge apparatus 4000 that has generated the first information.

Collection rules may indicate another piece of information. For example, collection rules may indicate a second information compression method. For example, the first information transmission unit 4060 transmits the second information after compressing the second information based on the compression method indicated in the collection rules. For example, suppose that the second information acquisition unit 3040 reads the second information from the second information storage unit 4050. In this case, for example, the second information acquisition unit 3040 reads the second information after compressing the second information in the second information storage unit 4050 in accordance with the collection rules. In this manner, it is achieved to reduce the load on the communication network 10 when the server apparatus 3000 acquires the second information.

For example, collection rules may indicate when to start collecting the second information. In this case, for example, it is possible to cause the respective server apparatuses 3000 to collect the second information at different timings. In two server apparatuses 3000, if the time of starting the collection of the second information is different even if the collection frequency of the second information is the same, the timings at which the two server apparatuses 3000 collect the second information do not overlap. Therefore, it is achieved to reduce the load on the communication network 10.

<<Collection Rules Table 200>>

FIG. 9 is a diagram illustrating the information stored in the collection rules storage unit 5000 in a table format. The table shown in FIG. 9 is named as a collection rules table 200. Each record of the collection rules table 200 indicate a record ID 202, a signal set 206, content 208, a frequency 210, an application target 212, a priority 214, and the number of applying 216. The record ID 202 indicates an ID of a record. The signal set 206 indicates a combination of "edge apparatus 4000 and first information" associated with the collection rules. For example, the signal set 206 in the record in the first row shown in FIG. 9 indicates a combination of "first information showing edge E1 and x=s0". That is, when the first information acquisition unit 3020 acquires the first information showing x=s0 from the edge E1, the collection rules acquisition unit 3060 acquires the collection rules indicated by the record in the first row shown in FIG. 9.

Collection rules are represented with the content 208, the frequency 210, and the application target 212. The content 208 indicates the content of the second information. The frequency 210 indicates a frequency of collecting the second information. The application target 212 indicates an ID of the edge apparatus 4000 to which collection rules are applied. In addition, the priority 214 and the number of applying 216 will be described later.

The collection rules acquisition unit 3060 searches for a record corresponding to the combination of "first information acquired by the first information acquisition unit 3020 and edge apparatus 4000 that has generated this first information" from the collection rules table 200. Specifically, the collection rules acquisition unit 3060 determines a record, which has a value of the signal set 206 that matches the combination of "first information acquired by the first information acquisition unit 3020 and the edge apparatus 4000 that has generated this first information", from the records of the collection rules table 200. Then, the collection rules acquisition unit 3060 acquires the content 208, the frequency 210, and the application target 212 of the determined record as collection rules.

The signal set 206 may indicate a combination of values indicated by a plurality of pieces of first information. For example, the signal set 206 in the record of the second row shown in FIG. 9 indicates a conditional expression of "the first information showing x=s1 is acquired from the edge E1, and the first information showing y=s1 is acquired from the edge E2". In addition, the signal set 206 may be a conditional expression showing the logical OR, such as "the first information showing x=s1 is acquired from the edge E1, or the first information showing y=s1 is acquired from the edge E2". Thus, by setting the collection rules based on the combination of the pieces of first information received from the plurality of edges, it is possible to collect the second information in consideration of the states of the plurality of edges.

In addition, the signal set 206 may indicate a combination of values indicated by the first information acquired within a predetermined period. For example, the signal set 206 in the record of the third row shown in FIG. 9 indicates the conditions of "the first information showing x=s2 is acquired from the edge E1, the first information showing y=s2 is acquired from the edge E3, and the difference between the reception times of the two pieces of first information is within 10 seconds".

In addition, the signal set 206 may indicate that the same determination result or the same parameter value is shown in the first information continuously a predetermined number of times or more. For example, the record of the fourth row shown in FIG. 9 shows "the first information showing x=s3 is acquired from the edge E4 consecutively three times".

In addition, when the signal set 206 indicates a combination of values indicated by a plurality of pieces of first information, the first information acquisition unit 3020 stores the acquired first information in a buffer or the like so as to match the acquisition time or the like. The collection rules acquisition unit 3060 searches for the collection rules table 200 with reference to the first information stored in the buffer.

The number of applying 216 indicates how many times the collection rules shown in the record are applied for the collection of the second information. For example, the number of applying 216 in the record of the first row shown in FIG. 9 indicates "10 times". Accordingly, acquiring of the second information under the application of the collection rules indicated by the record is performed 10 times. Each record in the collection rules table 200 may indicate the length of period to apply the collection rules instead of the number of applying 216.

Suppose that a plurality of records have been determined when the collection rules acquisition unit 3060 has searched the collection rules table 200. In this case, for example, the collection rules acquisition unit 3060 acquires collection rules from a record indicating the highest priority 214 among the plurality of the determined records. The collection rules acquisition unit 3060 may acquire a record with the smallest record ID 202 among the plurality of the determined records. In addition, the collection rules acquisition unit 3060 may acquire a record with the newest generation time and date among the plurality of determined records.

In addition, the collection rules table 200 may be configured such that the respective signal sets 206 always indicate different values. In this case, when the collection rules acquisition unit 3060 has searched the collection rules table 200 for a record matching the first information, the record being determined is not plural.

When a plurality of records are determined, the collection rules acquisition unit 3060 may acquire collection rules from the plurality of records and apply the collection rules in order of priority. For example, suppose that the search result of the collection rules acquisition unit 3060 indicates two records of records X and Y. In addition, suppose the number of applying 216 in the record X with higher priority indicates 5 times and the number of applying 216 in the record Y with lower priority indicates twice. In this case, the second information is acquired 5 times in accordance with the collection rules indicated by the record X, and then the second information is acquired twice in accordance with the collection rules indicated by the record Y. For example, by making a record with higher priority indicate a higher frequency, the server apparatus 3000 can operate so as to acquire the second information while gradually lowering the acquisition frequency of the second information.

The second information acquisition unit 3040 acquires the second information at various timings. For example, the second information is acquired only when the collection rules acquisition unit 3060 acquires collection rules. For example, when the collection rules acquisition unit 3060 does not acquire collection rules, the second information may be acquired regularly or irregularly.

Suppose that, when collection rules (hereinafter, referred to as collection rules 1) are applied to a certain edge apparatus 4000, the collection rules acquisition unit 3060 further acquires other collection rules to applied to the edge apparatus 4000 (hereinafter, referred to as collection rules 2). In this case, there are various methods of handling the collection rules 2. For example, the application of the collection rules 1 is stopped, and the collection rules 2 are newly applied. The collection rules 2 do not necessarily need to be applied. The collection rules 2 may be applied after the end of the application of the collection rules 1. In addition, priority may be given to the collection rules (for example, the priority 214 in the collection rules table 200), and the application of the collection rules 1 may be stopped and the collection rules 2 may be applied only when the priority of the collection rules 2 is higher than the priority of the collection rules 1.

Second Exemplary Embodiment

Figure 10:
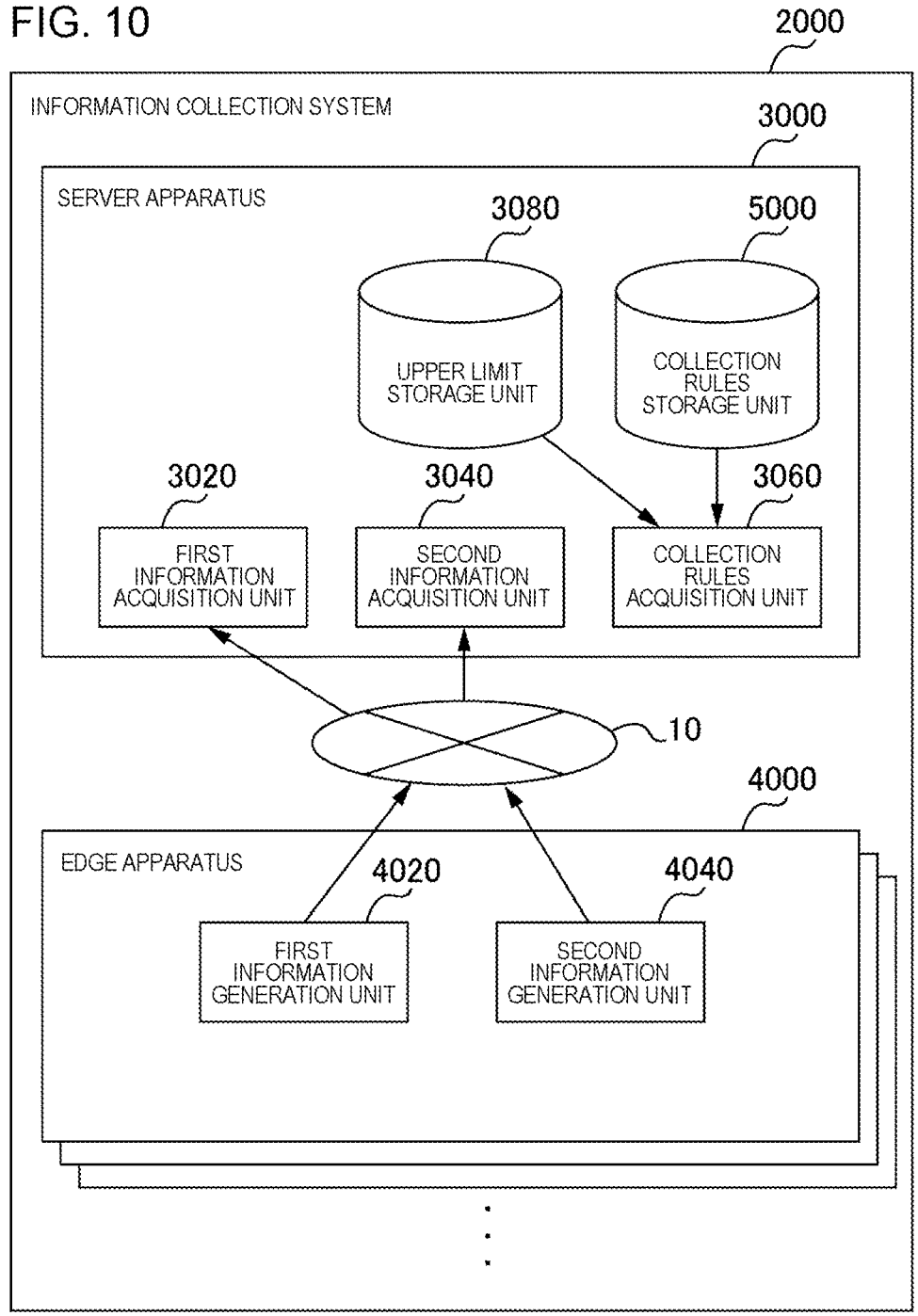
FIG. 10 is a block diagram illustrating an information collection system according to a second exemplary embodiment.

FIG. 10 is a block diagram illustrating an information collection system 2000 according to a second exemplary embodiment. In FIG. 10, arrows indicate the flow of information. In FIG. 10, each block does not indicate the configuration of hardware units, but indicates the configuration of functional units.

In the information collection system 2000 of the present exemplary embodiment, second information is collected in consideration of the load on the information collection system 2000. Therefore, the server apparatus 3000 includes an upper limit storage unit 3080 that stores a load upper limit. The load upper limit is an upper limit of the load that the information collection system 2000 tolerates.

The collection rules storage unit 5000 in the second exemplary embodiment indicates collection rules so as to be associated with the collection load. The collection load associated with collection rules indicates a load that is applied to the information collection system 2000 due to the acquisition of the second information performed based on the collection rules.

FIG. 11 is a diagram illustrating a collection rules table in the second exemplary embodiment. The collection rules table shown in FIG. 11 is named as a collection rules table 400. A record ID 402 to the number of applying 416 in the collection rules table 400 are the same as the record ID 202 to the number of applying 216 in the collection rules table 200, respectively. Unlike the collection rules table 200, the collection rules table 400 includes a collection load 418. The collection load 418 of each record indicates a collection load on the collection rules table 200 when the second information is collected based on the collection rules indicated by the record.

The collection rules acquisition unit 3060 in the second exemplary embodiment acquires collection rules so that the total value of the collection loads indicated by the respective collection rules currently applied is equal to or less than the load upper limit.

Figure 12:
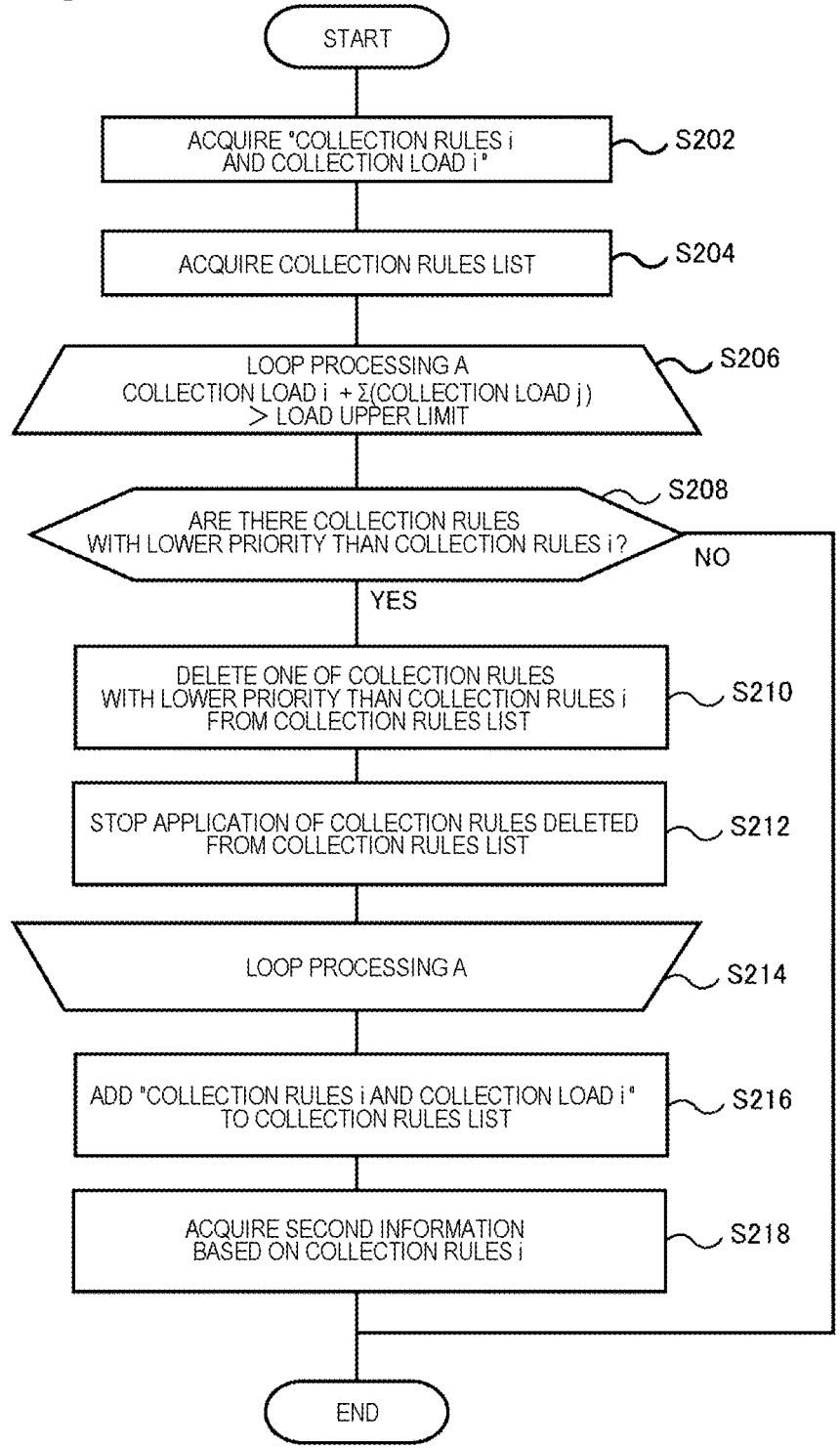
FIG. 12 is a flowchart illustrating the flow of the process performed by a server apparatus in the second exemplary embodiment.

For example, the server apparatus 3000 performs the process in accordance with the flow shown in the flowchart in FIG. 12. In step S202, the collection rules acquisition unit 3060 acquires from the collection rules storage unit 5000 a combination of "collection rules and collection load" corresponding to the first information acquired by the first information acquisition unit 3020 and the edge apparatus 4000 that has generated the first information. Hereinafter, these will be written as collection rules i and a collection load i. In step S204, the collection rules acquisition unit 3060 acquires a collection rules list that is a list of collection rules that are currently applied to each edge apparatus 4000. In this case, the server apparatus 3000 includes a rules list storage unit that stores the collection rules list.

Steps S206 to S214 constitute loop processing A that is repeatedly performed. The loop processing A is repeatedly performed while the condition of "a sum of the collection load i and the total value of the collection load included in the collection rules list is larger than the load upper limit" is satisfied. In step S206, the collection rules acquisition unit 3060 determines whether or not to continue the loop processing A. When the loop processing A is continued, the process shown in FIG. 12 proceeds to step S208. On the other hand, when the loop processing A is not continued, the process shown in FIG. 12 proceeds to step S216.

In step S208, the collection rules acquisition unit 3060 determines whether or not collection rules with lower priority than the collection rules i are present in the collection rules list. When collection rules with lower priority than the collection rules i are not present (step S208: NO), the process shown in FIG. 12 is ended. On the other hand, when collection rules with lower priority than the collection rules i are present (step S208: YES), the process shown in FIG. 12 proceeds to step S210. In step S210, the collection rules acquisition unit 3060 deletes one of collection rules with lower priority than the collection rules i from the collection rules list. In step S212, the collection rules acquisition unit 3060 stops applying of the collection rules deleted from the collection rules list. That is, collecting of the second information based on the collection rules is stopped. Step S214 is the end of the loop processing A. Then, the process shown in FIG. 12 proceeds to step S206.

In step S216, the collection rules acquisition unit 3060 adds "collection rules i and collection load i" to the collection rules list. In step S218, the collection rules acquisition unit 3060 acquires the second information based on the collection rules i.

When the process proceeds to step S216 after ending the loop processing A, the conditional expression shown in step S206 is satisfied. Accordingly, even if collecting of the second information based on the collection rules i is performed, the load on the information collection system 2000 does not exceed the load upper limit. Thus, by performing the process in accordance with the flow shown in FIG. 12, it is achieved to prevent the load on the information collection system 2000 from exceeding the load upper limit.

Note that, the flow of the process performed by the server apparatus 3000 in the second exemplary embodiment is not limited to the flow shown in FIG. 12. For example, in the case shown in FIG. 12, collection rules the application of which is to be stopped are determined based on the priority of collection rules. However, the collection rules acquisition unit 3060 may stop applying collection rules in order of the time at which the collection rules are applied, for example. For example, the collection rules acquisition unit 3060 may determine a combination of collection rules the application of which is to be stopped so that the number of collection rules the application of which is to be stopped is minimized. This combination is intended to minimize the number of collection rules, and can be determined by solving the optimization problem based on the constraint that the sum of loads does not exceed the load upper limit.

In addition, the server apparatus 3000 may not use the collection rules list. For example, the server apparatus 3000 may store the total load value, which is a total value of the load on the information collection system 2000 caused by the currently applied collection rules, and may use the total load value. In this case, the collection rules acquisition unit 3060 does not perform collecting of the second information based on the collection rules i when the sum of the total load value and the collection load i is larger than the load upper limit. On the contrary, when the sum of the total load value and the collection load i is equal to or less than the load upper limit, collecting of the second information based on the collection rules i is performed. When a collection rules list is not used, it is difficult to select appropriate collection rules from the collection rules being applied and stop applying. However, since the server apparatus 3000 does not need to store a collection rules list, it is achieved to reduce the capacity of a storage or a memory required for the server apparatus 3000. In addition, since it is not necessary to perform processing, such as selecting collection rules to be removed from the collection rules list, time of processing required for starting collecting the second information is shortened.

<Update of the Load Upper Limit>

In addition, the server apparatus 3000 in the second exemplary embodiment may have a function of updating the load upper limit stored in the upper limit storage unit 3080. The load upper limit that is an upper limit of the load that the information collection system 2000 tolerates may be changed. For example, since there is information transmitted and received through the communication network 10 other than the second information, it would be considered that the load on the communication network 10 is changed due to such transmissions or receptions. Therefore, the server apparatus 3000 acquires information regarding the load on the information collection system 2000, and updates the load upper limit based on the information.

Figure 13:
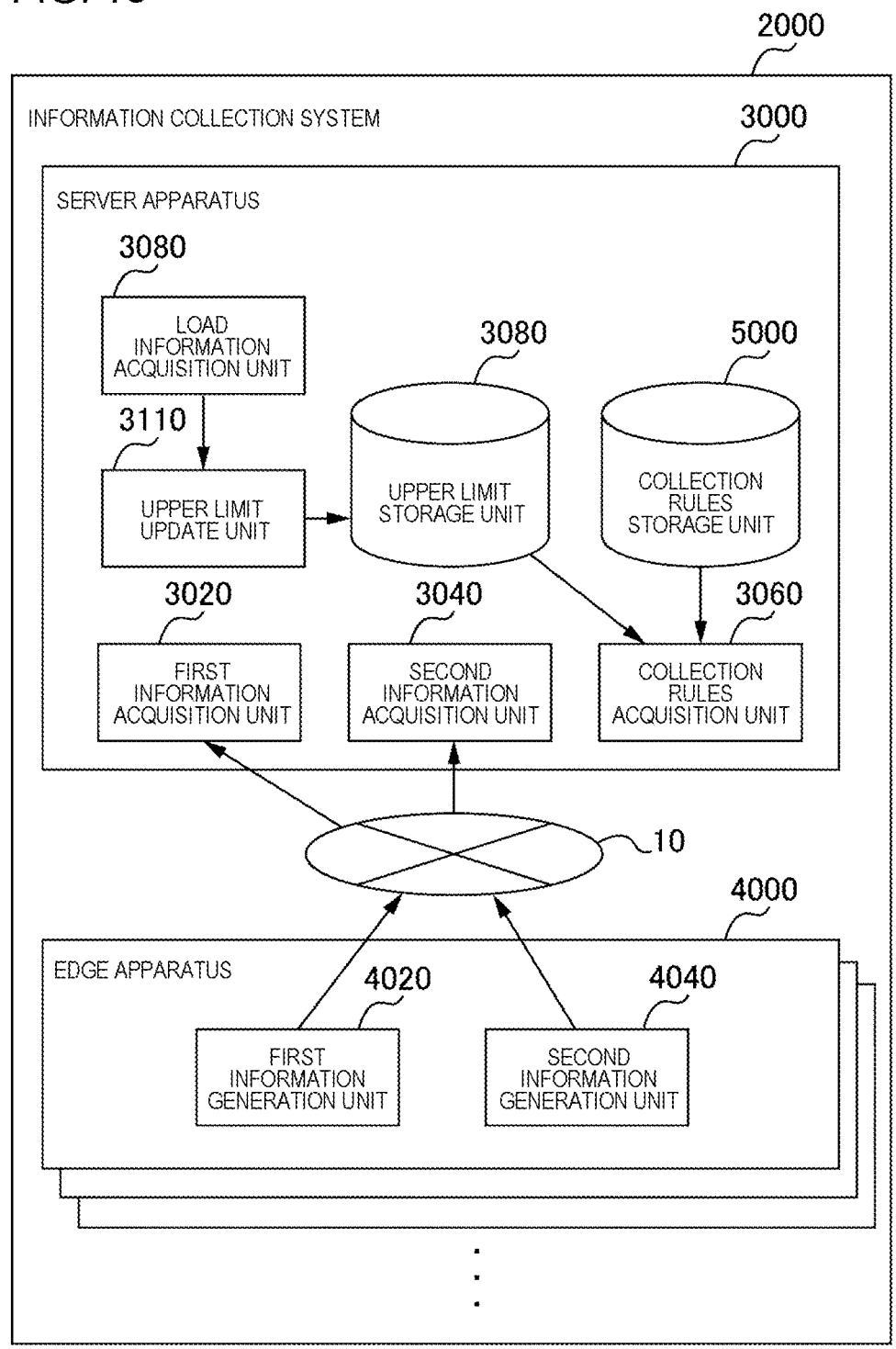
FIG. 13 is a block diagram illustrating an information collection system in the second exemplary embodiment that has a function of updating the load upper limit.

FIG. 13 is a block diagram illustrating the information collection system 2000 of the second exemplary embodiment that has a function of updating the load upper limit. In FIG. 13, arrows indicate the flow of information. In FIG. 13, each block does not indicate the configuration of hardware units, but indicates the configuration of functional units.

The server apparatus 3000 includes a load information acquisition unit 3090 and an upper limit update unit 3110.

The load information acquisition unit 3090 acquires load information that is information regarding the load on the information collection system 2000.

For example, the load information is information indicating the load on the communication network 10. In this case, the information collection system 2000 includes a network load measuring unit that measures the load on the communication network 10. The network load measuring unit may be provided inside the server apparatus 3000, or may be provided inside the edge apparatus 4000, or may be separately provided for network measurement. Since a method of measuring the network load at an end host and a method of measuring the network load with a device provided between end hosts are well-known techniques, detailed explanation thereof will not be omitted.

In addition, for example, the load information indicates the load on the server apparatus 3000 or the load on the edge apparatus 4000. The load on the server apparatus 3000 or the edge apparatus 4000 is represented as the utilization of the computer resources in the server apparatus 3000 or the edge apparatus 4000, for example. The load information of the edge apparatus 4000 may be collected together with the first information, or may be collected separately.

The upper limit update unit 3110 updates the load upper limit stored in the upper limit storage unit 3080 based on the load information. Suppose that a network load is used as load information. In this case, the load upper limit indicates the network bandwidth of the communication network 10 that can be used for collecting the second information. In addition, the collection load corresponding to collection rules indicates a network bandwidth used by the collection of the second information based on the collection rules. Then, the load upper limit can be calculated by subtracting the network bandwidth, which is used for other than collecting the second information, from the maximum network bandwidth of the communication network 10. The network bandwidth used for other than collecting the second information is calculated based on the load information. In addition, the load upper limit may also be calculated by further subtracting a predetermined margin from the value calculated by the calculation method described above.

<Operations and Effects>

According to the present exemplary embodiment, the second information is collected in consideration of the load on the information collection system 2000. Specifically, collection rules to be applied are determined so that the total value of the collection load of the collection rules to be applied is equal to or less than the load upper limit. Thus, it is achieved to prevent the information collection system 2000 from being burdened with a high load caused by collecting of the second information.

As described above, the information collection system 2000 of the second exemplary embodiment may have a function of updating the load upper limit. In this case, collection rules used for collecting the second information can be determined in consideration of the load on the information collection system 2000 other than the load caused by collecting of the second information. Therefore, it is achieved to prevent with higher probability the communication network from being burdened with a high load caused by collecting of the second information.

Third Exemplary Embodiment

Figure 14:
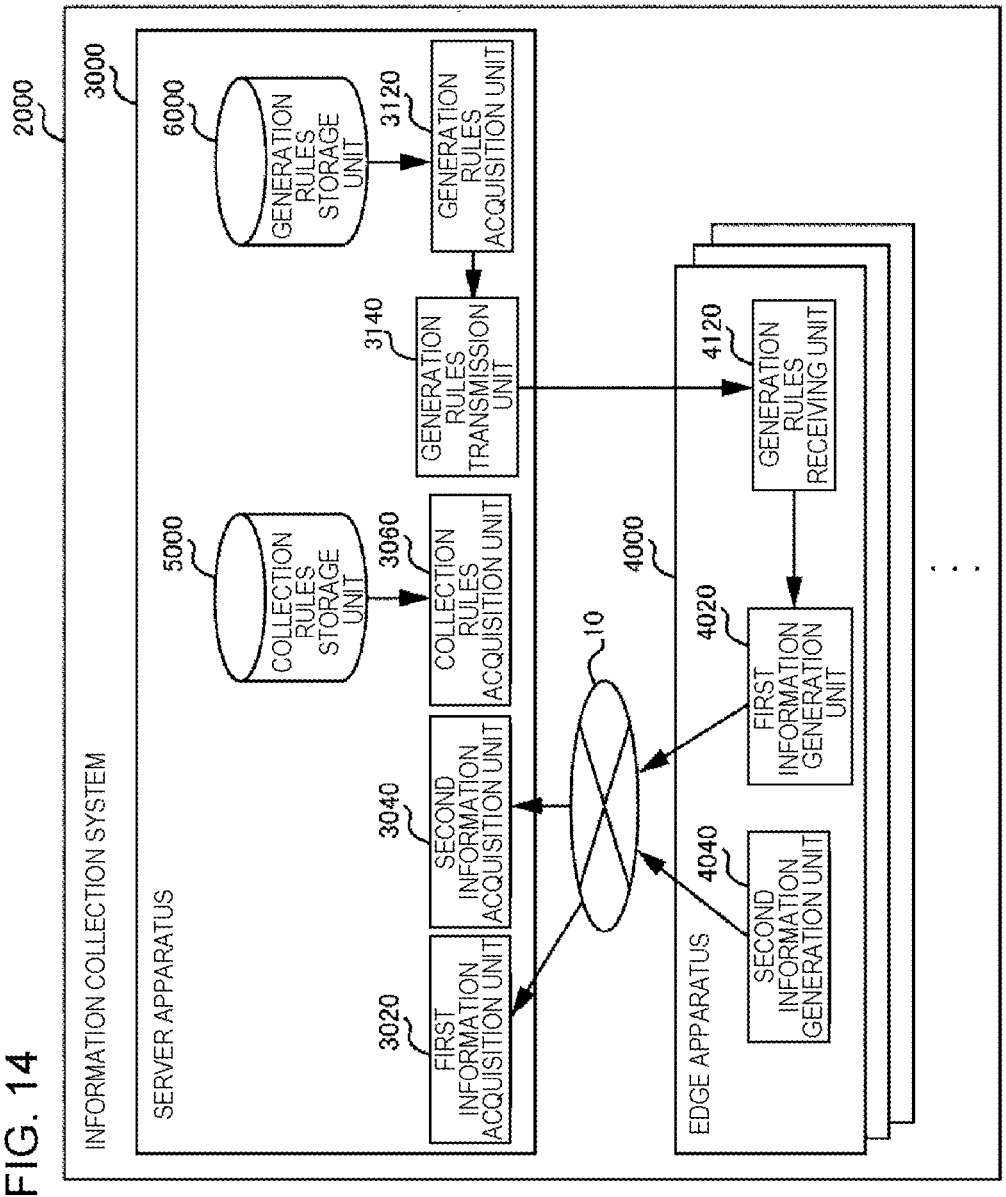
FIG. 14 is a block diagram illustrating an information collection system according to a third exemplary embodiment.

FIG. 14 is a block diagram illustrating an information collection system 2000 according to a third exemplary embodiment. In FIG. 14, arrows indicate the flow of information. In FIG. 14, each block does not indicate the configuration of hardware units, but indicates the configuration of functional units.

An edge apparatus 4000 of the third exemplary embodiment acquires rules regarding the generation of the first information from the outside. Detailed explanation thereof will be given below.

<Generation Rules Storage Unit 6000>

The information collection system 2000 of the third exemplary embodiment includes a generation rules storage unit 6000. The generation rules storage unit 6000 stores generation rules. The generation rules are associated with the first information and the edge apparatus 4000 that has generated the first information, and indicates rules regarding the generation of the first information.

For example, the generation rules indicate a method of generating the first information or the contents of the first information. For example, suppose that the first information is information indicating whether or not an anomaly has occurred in the edge apparatus 4000 or the device to be monitored by the edge apparatus 4000. In this case, the generation rules are rules for determining whether or not an anomaly has occurred in the edge apparatus 4000 or the device to be monitored by the edge apparatus 4000. For example, these are rules indicating "when is anomaly determination to be made in association with the rage of the utilization of certain computer resources?" for the utilization of each computer resource. In addition, for example, these are rules indicating "when is anomaly determination to be made in association with the range of the value of a certain variable?" in software running on the edge apparatus 4000 or the device to be monitored by the edge apparatus 4000.

In addition, suppose that the generation rules indicate the content of the first information. In this case, the first information generation unit 4020 generates the first information indicating the content shown in the generation rules. In this case, for example, the generation rules indicate an anomaly determination result regarding which element to be included in the first information, which parameter to be included in the first information, or the like in the edge apparatus 4000 or the device to be monitored by the edge apparatus 4000.

The generation rules storage unit 6000 may be provided inside the server apparatus 3000, or may be provided outside the server apparatus 3000. A method of implementing the generation rules storage unit 6000 is the same as the method of implementing the collection rules storage unit 5000.

<Server Apparatus 3000>

The server apparatus 3000 includes a generation rules acquisition unit 3120 and a generation rules transmission unit 3140. The generation rules acquisition unit 3120 acquires from the generation rules storage unit 6000 generation rules corresponding to the first information acquired by the first information acquisition unit 3020 and to the edge apparatus 4000 that has generated the first information. The generation rules transmission unit 3140 transmits the generation rules corresponding to the edge apparatus 4000 to the edge apparatus 4000.

<Edge Apparatus 4000>

The edge apparatus 4000 includes a generation rules receiving unit 4120 that receives generation rules. When the generation rules receiving unit 4120 receives generation rules, the first information generation unit 4020 in the third exemplary embodiment generates the first information using the generation rules.

<Regarding First Information Generated Before Receiving Generation Rules>

The generation rules acquisition unit 3120 acquires generation rules corresponding to the first information. For this reason, the edge apparatus 4000 needs to generate the first information before the generation rules transmission unit 3140 acquires the generation rules. Therefore, for example, default generation rules are set for each edge apparatus 4000. The first information generation unit 4020 generates the first information based on the default generation rules until the generation rules receiving unit 4120 acquires the generation rules from the generation rules transmission unit 3140.

<Generation Rules Table 300>

Figure 15:
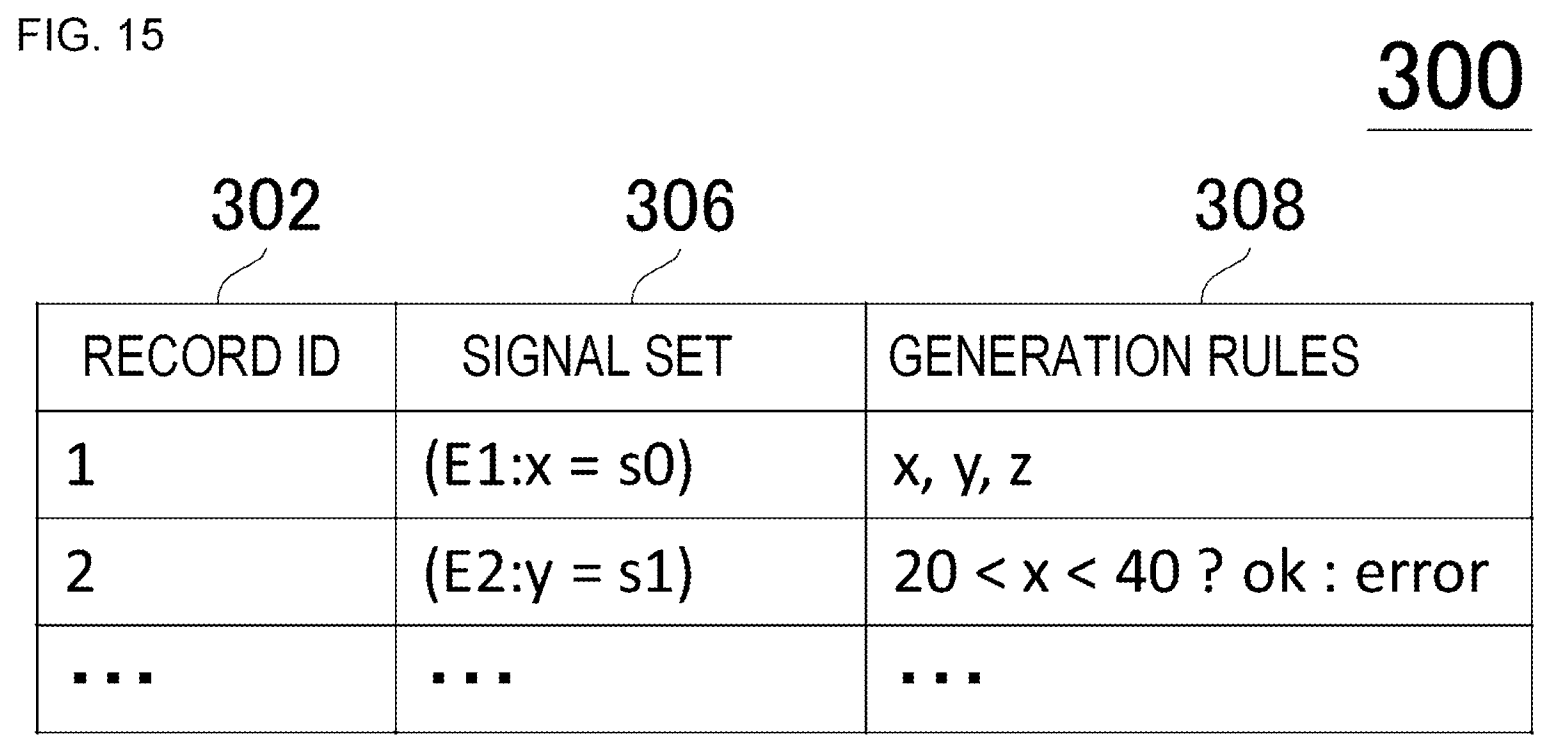

FIG. 15 is a diagram illustrating the information stored in the generation rules storage unit 6000 in a table format. The table shown in FIG. 15 is named as a generation rules table 300. Respective records of the server apparatus 3000 indicate a record ID 302, a signal set 306, and generation rules 308. The record ID 302 is an ID of a record. The signal set 306 indicates a combination of "edge apparatus 4000 and first information" associated with the generation rules. The signal set 306 may indicate a plurality of combinations of "edge apparatus 4000 and first information", similar to the signal set 206 shown in FIG. 9.

A method in which the generation rules acquisition unit 3120 acquires the generation rules from a generation rules table 300 is the same as the method in which the collection rules acquisition unit 3060 acquires the collection rules from the collection rules table 200.

The generation rules 308 in the record of the first row shown in FIG. 15 is an example showing the content to be included in the first information (combination of parameters) as a rule for generating the first information. In addition, the record of the second row shown in FIG. 15 is an example showing a conditional expression for determining whether or not there is an anomaly in the edge apparatus 4000 as a rule for generating the first information. This conditional expression is a conditional expression for determining that the edge apparatus 4000 is normal (OK) when the value of a parameter x satisfies the conditions of 20<x<40 and determining that the edge apparatus 4000 is under an anomaly (error) when the value of the parameter x does not satisfy the conditions of 20<x<40.

<Flow of Process>

Figure 16:
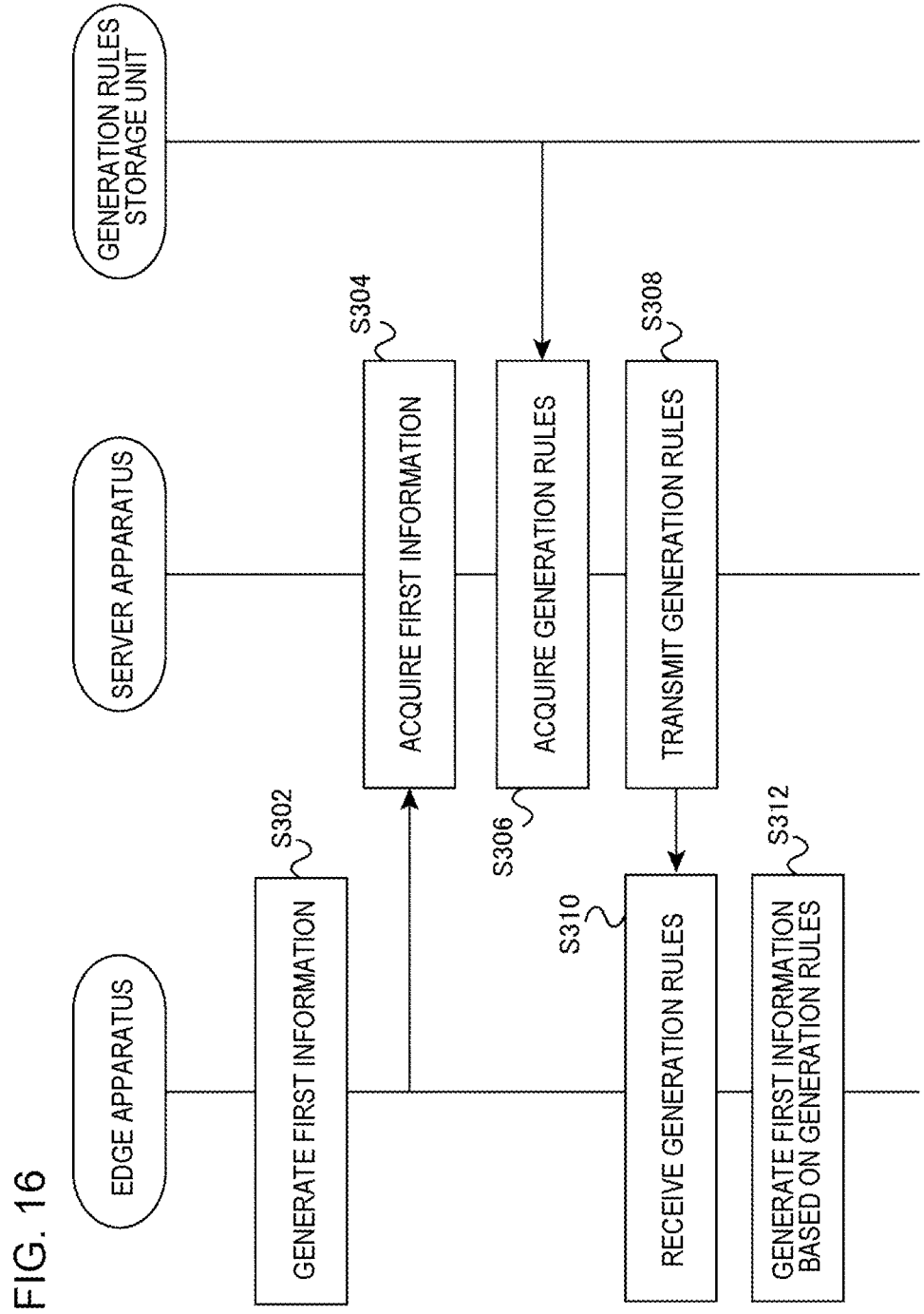
FIG. 16 is a diagram illustrating the flow of the process performed by the information collection system in the third exemplary embodiment.

FIG. 16 is a diagram illustrating the flow of the process performed in the information collection system 2000 of the third exemplary embodiment. In step S302, the first information generation unit 4020 generates the first information. In step S304, the first information acquisition unit 3020 acquires the first information. In step S306, the generation rules acquisition unit 3120 acquires from the generation rules storage unit 6000 generation rules corresponding to the first information acquired in step S304 and to the edge apparatus 4000 that has generated the first information. In step S308, the generation rules transmission unit 3140 transmits the generation rules to the edge apparatus 4000. In step S310, the edge apparatus 4000 receives the generation rules. In step S312, the first information generation unit 4020 generates the first information based on the generation rules.

<Operations and Effects>

In the present exemplary embodiment, the first information generation unit 4020 generates the first information based on the generation rules. Therefore, the rules for that each edge apparatus 4000 generates the first information can be centrally managed in the generation rules storage unit 6000. Therefore, the management of generation rules of the first information (for example, the change of generation rules) becomes easier.

By determining the first information generation rules so as to match the first information and the edge apparatus 4000 that has generated the first information, it is achieved to flexibly determine the first information generation rules based on the state of the edge apparatus 4000 or the device to be monitored by the edge apparatus 4000.

In addition, it is preferable that the edge apparatus 4000 generate the first information based on the generation rules acquired from the outside, and it is not necessary to determine the first information generation rules in the edge apparatus 4000. Therefore, since the implementation of the edge apparatus 4000 can be simplified, it is achieved to reduce the cost of the edge apparatus 4000 or reduce the size of the edge apparatus 4000.

While the exemplary embodiments of the invention have been described with reference to the diagrams, these are only examples of the invention, and the combination of the above exemplary embodiments and various configurations other than the above exemplary embodiments can also be adopted.

This application claims priority from Japanese Patent Application No. 2013-243299, filed on Nov. 25, 2013, the entire contents of which are incorporated herein.

The invention claimed is:

1. An information collection system comprising:
    storage that stores first collection rules associated with an edge apparatus and with first information to be acquired from the edge apparatus, a frequency of acquiring second information with the edge apparatus, and an expected load on the information collection system for acquiring the second information according to the first collection rules, and comprising at least one of: content of information included in the second information and information related to the edge apparatus;
    and a server comprising:
        a memory device that stores instructions; and
        at least one hardware processor configured to execute the instructions to:
            acquire first information from a first edge apparatus;
            acquire, from the storage, first collection rules that are associated with the acquired first information and with the edge apparatus and that associate a frequency of acquiring second information with the edge apparatus;
            select one or more of the first collection rules based on a determination that a sum of the expected load associated with each of the one or more of the first collection rules is equal to or less than a load upper limit of the information collection system; and
            acquire second information from the edge apparatus according to the selected one or more of the first collection rules.

2. The information collection system according to claim 1,
    wherein the storage further stores first generation rules, the first generation rules being associated with the first information and with the first edge apparatus, the first generation rules including rules regarding generation of the first information,
    wherein the at least one hardware processor is configured to execute the instructions to:
        acquire, from the storage, the first generation rules, and transmit the first generation rules to the edge apparatus, the first generation rules enabling the edge apparatus to generate the first information based on the first generation rules.

3. The information collection system according to claim 1,
    wherein the at least one hardware processor is configured to execute the instructions to transmit the first collection rules to the first edge apparatus, the transmission of the first collection rules enabling the first edge apparatus to transmit the second information to the server apparatus based on the first collection rules.

4. The information collection system according to claim 1,
    wherein the at least one hardware processor is configured to execute the instructions to acquire the second information from storage based on the first collection rules.

5. The information collection system according to claim 1,
    wherein the first edge apparatus is configured to transmit the first information to the server.

6. The information collection system according to claim 1,
    wherein the first edge apparatus stores the first information.

7. The information collection system according to claim 1,
    wherein the first information include an indication that an anomaly has occurred in the first edge apparatus; and
    wherein the second information include information regarding content of the anomaly.

8. The information collection system according to claim 7, wherein the frequency of acquiring second information is related to a degree of the anomaly.

9. The information collection system according to claim 1,
    wherein at least one of the first information and the second information includes location information of the first edge apparatus.

10. The information collection system according to claim 9, wherein the at least one hardware processor is configured to execute the instructions to:
    responsive to determining that the first edge apparatus is within a predetermined distance from the server, acquire the second information from the first edge apparatus based on the first collection rules.

11. The information collection system according to claim 1,
    wherein the first edge apparatus is configured to monitor a status of a vehicle;
    wherein the first information indicates a remaining amount of gas in the vehicle, and the second information indicates a location of a gas station.

12. The information collection system according to claim 1,
    wherein the first information indicates a remaining amount of the gas in a vehicle, and the second information indicates a location of a gas station, if a status of the vehicle is monitored by the first edge apparatus;
    wherein the first information indicates an anomaly of a gas cylinder, and the second information indicates a remaining amount of gas in the gas cylinder, if a status of the gas cylinder is monitored by the at first edge apparatus; and
    wherein the first information indicates an anomaly of a vending machine, and the second information indicates a remaining number of goods and/or money in the vending machine, if a status of the vending machine is monitored by the first edge apparatus.

13. The information collection system according to claim 1, wherein the frequency of acquiring second information is related to a location of the first edge apparatus.

14. The information collection system according to claim 1, wherein the first collection rules are also associated with one or more priorities, and wherein the acquisition of the first collection rules are such that a number of the first collection rules to be stopped based on the associated priorities is below a threshold value.

15. The information collection system according to claim 14, wherein the second collection rules are associated with a second collection load that includes information about an expected load on the information collection system caused by the acquisition of the fourth information based on the second collection rules; and wherein the server apparatus is further configured to execute the instructions to acquire the first and second collection rules such that a sum of the expected load associated with the first and second collection rules is equal to or less than the load upper limit.

16. The information collection system according to claim 1, wherein the server apparatus is further configured to execute the instructions to:
acquire third information and fourth information from second edge apparatus; and
acquire, from the storage, second collection rules, the second collection rules being associated with the second edge apparatus and with the third information.

17. The information collection system according to claim 1, wherein the at least one hardware processor is configured to execute the instructions to:
acquire network load information about a load on a network through which the server acquires the second information from the first edge apparatus; and
update the load upper limit based on the network load information.

18. A control method performed by a server, the method comprising:
acquiring first information from a first edge apparatus;
acquiring, from a storage, first collection rules, the first collection rules being associated with the first edge apparatus, the acquired first information, a frequency of acquiring second information with the first edge apparatus, and an expected load on the information collection system for acquiring the second information according to the first collection rules, and comprising at least one of:
content of information included in the second information and information related to the first edge apparatus;
selecting one or more of the first collection rules based on a determination that a sum of the expected load associated with each of the one or more of the first collection rules is equal to or less than a load upper limit of the information collection system; and
acquiring second information from the first edge apparatus according to the selected one or more of the first collection rules.

19. The control method according to claim 18, wherein the control method further comprises:
acquiring, from the storage, first generation rules, the first generation rules being associated with the first edge apparatus and with the first information, the first generation rules including rules regarding generation of the first information; and
transmitting the first generation rules to the first edge apparatus, the first generation rules enabling the first edge apparatus to generate the first information based on the first generation rules.

20. The control method according to claim 18, further comprising:
transmitting the first collection rules to the first edge apparatus, the transmission of the first collection rules enabling the first edge apparatus to transmit the second information to the server apparatus based on the first collection rules.

21. The control method according to claim 18, wherein the method further comprises:
acquiring the second information from the storage based on the first collection rules.

22. The control method according to claim 18, wherein the first information include an indication that an anomaly has occurred in the first edge apparatus; and
wherein the second information include information regarding content of the anomaly.

23. The control method according to claim 18, wherein at least one of the first information and the second information includes location information of the first edge apparatus.

24. A non-transitory computer-readable storage medium storing a program that, when executed by a server, cause the server to perform a control method, the method comprising:
acquiring first information from a first edge apparatus;
acquiring, from storage, first collection rules, the first collection rules being associated with the first edge apparatus, the acquired first information, a frequency of acquiring second information with the first edge apparatus, and an expected load on the information collection system for acquiring the second information according to the first collection rules, and comprising at least one of:
content of information included in the second information and information related to the first edge apparatus;
selecting one or more of the first collection rules based on a determination that a sum of the expected load associated with each of the one or more of the first collection rules is equal to or less than a load upper limit of the information collection system; and
acquiring second information from the first edge apparatus according to the selected one or more of the first collection rules.

25. The storage medium according to claim 24, wherein the control method further comprises:
acquiring, from the storage, first generation rules, the first generation rules being associated with the first edge apparatus and with the first information, the first generation rules including rules regarding generation of the first information; and
transmitting the first generation rules to the first edge apparatus, the first generation rules enabling the first edge apparatus to generate the first information based on the first generation rules.

26. The storage medium according to claim 24, wherein the control method further comprises transmitting the first collection rules to the first edge apparatus, the transmission of the first collection rules enabling the first edge apparatus to transmit the second information to the server apparatus based on the first collection rules.

27. The storage medium according to claim 24, wherein the control method further comprises:

acquiring the second information from the storage based on the first collection rules.

28. The storage medium according to claim 24, wherein the first information include an indication that an anomaly has occurred in the first edge apparatus; and wherein the second information include information regarding content of the anomaly.

29. The storage medium according to claim 24, wherein at least one of the first information and the second information includes location information of the first edge apparatus.

* * * * *